United States Patent
Kimura et al.

(10) Patent No.: US 8,874,965 B2
(45) Date of Patent: Oct. 28, 2014

(54) CONTROLLING PROGRAM CODE EXECUTION SHARED AMONG A PLURALITY OF PROCESSORS

(75) Inventors: Toshio Kimura, Odawara (JP); Jun Kitahara, Odawara (JP); Hiroji Shibuya, Odawara (JP); Kazushige Nagamatsu, Odawara (JP); Nakaba Sato, Odawara (JP); Mika Teranishi, Ninomiya-machi (JP)

(73) Assignee: Hitachi, Ltd., Tokyo (JP)

( * ) Notice: Subject to any disclaimer, the term of this patent is extended or adjusted under 35 U.S.C. 154(b) by 441 days.

(21) Appl. No.: 13/319,882

(22) PCT Filed: Oct. 26, 2011

(86) PCT No.: PCT/JP2011/005970
§ 371 (c)(1),
(2), (4) Date: Nov. 10, 2011

(87) PCT Pub. No.: WO2013/061369
PCT Pub. Date: May 2, 2013

(65) Prior Publication Data
US 2013/0111270 A1    May 2, 2013

(51) Int. Cl.
*G06F 11/00* (2006.01)
*G06F 11/36* (2006.01)

(52) U.S. Cl.
CPC ............... *G06F 11/3632* (2013.01); *G06F 11/3664* (2013.01)
USPC .............. 714/34; 714/35; 712/227

(58) Field of Classification Search
CPC . G06F 11/3664; G06F 11/26; G06F 11/3656; G06F 11/267; G06F 11/2733; G06F 11/348; G06F 11/3632; G06F 11/3636
USPC ..................... 714/34, 35; 712/227
See application file for complete search history.

(56) References Cited

U.S. PATENT DOCUMENTS 5,678,003 A * 10/1997 Brooks ........................... 714/34
6,925,584 B2 * 8/2005 Padwekar et al. ............... 714/30

(Continued)

FOREIGN PATENT DOCUMENTS

JP    02-022757 A    7/1988
WO   2004/017204 A2  2/2004

OTHER PUBLICATIONS

Paul Koning, "Re: Improving GDB for multicore and embedded system!" 2 pages, published Mar. 2, 2007 (XP-002666434).

(Continued)

*Primary Examiner* — Bryce Bonzo
*Assistant Examiner* — Elmira Mehrmanesh
(74) *Attorney, Agent, or Firm* — Volpe and Koenig, P.C.

(57) ABSTRACT

The present invention enables program codes to be shared among processors 211. To prevent the debug operation of one processor 211 from affecting the debug operation of the other processors 211, when detecting a breakpoint during execution of a program code, a debugger 410 or a debugger stub 520 controls the execution of the program code while exchanging breakpoint information 800 with the other debuggers 410 or the other debugger stubs 520. Furthermore, a circuit 170 is created which prevents the program code being carelessly rewritten due to thermal runaway, a bug, and the like of a processor 211, and the protection setting by the protection logic 71 in the circuit 170 is released only in case the processor 211 accesses each of a plurality of registers from 65 to 67 in specified order.

17 Claims, 25 Drawing Sheets

(56) References Cited

U.S. PATENT DOCUMENTS

| | | | |
|---|---|---|---|
| 6,990,657 B2 * | 1/2006 | Hunter et al. | 717/129 |
| 7,581,087 B2 * | 8/2009 | John | 712/227 |
| 7,689,867 B2 * | 3/2010 | Rosenbluth et al. | 714/34 |
| 7,992,042 B2 * | 8/2011 | Todoroki et al. | 714/34 |
| 8,402,314 B2 * | 3/2013 | Balkan et al. | 714/31 |
| 8,423,959 B1 * | 4/2013 | Petras | 717/124 |
| 2005/0188358 A1 * | 8/2005 | Johnson et al. | 717/129 |
| 2007/0168651 A1 | 7/2007 | John | |

OTHER PUBLICATIONS

DevTech Support, Freescale Semiconductor, Inc., Austin, Texas "Debugging Multicore StarCore DSP Applications with Eclipse" 32 pages, dated Jun. 2010 (XP-002666431).

Matassa et al., "Multi-Core Debugging for Atom Processors" 4 pages, published Aug. 17, 2010 (XP-002666427).

* cited by examiner

CONTROLLING PROGRAM CODE EXECUTION SHARED AMONG A PLURALITY OF PROCESSORS

TECHNICAL FIELD

The present invention relates to an information system and a control method of the information system.

BACKGROUND ART

PTL 1 discloses, in a multi-processor system where a plurality of processors share a single system bus, installing a system bus control apparatus which manages usage status of a plurality of buses and grants permission to use the system bus, installing means for selecting and using a plurality of buses in the processing units, configuring the system bus of an instruction-dedicated shared bus used for data transfer related to instruction fetch and an operand-dedicated shared bus used for data transfer related to operand read and write, installing an instruction shared bus control apparatus and an operand shared bus control apparatus are installed, and the like for the purpose of solving the performance deterioration caused by the competition of access from a plurality of processing units in the system bus, achieving high throughput by a small amount of hardware, and the like.

CITATION LIST

Patent Literature

PTL 1: Japanese Patent Application Laid-Open No. H2-22757 Publication

SUMMARY OF INVENTION

Technical Problem

Recently, application of multi-core processors is in progress for securing the processing performance which is required for high-functionality products. As processing methods of multi-core processors, an SMP (Symmetric Multiple Processor) configuration and an AMP (Asymmetric Multiple Processor) configuration are known.

Here, as for embedded devices for example, real-time quality is valued, but real-time quality is difficult to secure in the SMP configuration because tasks are dynamically assigned to respective core processors. Meanwhile, in an AMP configuration, tasks are independently assigned to each core processor so the real-time quality is easier to secure compared with the SMP configuration.

Meanwhile, in application of multi-core processors to embedded devices and others, efficient utilization of hardware resources is required, and sharing program codes among core processors also becomes important in the AMP configuration. Furthermore, in application of multi-core processors to storage products, memory resource reduction can be expected while maintaining scalability and performance guarantee by sharing program codes among core processors.

It should be noted that, when program codes are shared among core processors, an independent debug environment needs to be provided for each of the core processors however following problems are found in this case. For example, as shown in FIG. 25, in a case an independent debug environment is to be provided for each core processor 211 by assigning a debugger 410 and a debugger stub 520 for each of the core processors 211 in the multi-core processor 21, since each of the debuggers 410 is made to set a respective breakpoint for the same program code, the breakpoints need to be appropriately managed so that the debug operation of a particular core processor does not affect the debug operation of another core processor.

Furthermore, in case a program code is shared among core processors, if the program code is rewritten due to thermal runaway, a bug, and others, the risk of other core processors being adversely affected increases, and therefore the program code also needs be appropriately protected so that the program code is not carelessly rewritten.

The present invention has been made in view of the above-mentioned background for the purpose of providing an information system and a control method of the information system for enabling the program code to be shared among processors.

Solution to Problem

An aspect of the present invention for achieving the above-mentioned purposes is an information system including a plurality of processors configured to share and execute a program code stored in a memory; a debugger that implements a debug environment of the program code for each of the plurality of processors; and a plurality of debugger stubs communicatable with one another that are implemented in each of the plurality of processors, and communicate with the debugger to control execution of the program code by the processors, wherein each of the debugger stubs retain breakpoint setting information being information including a setting location of a breakpoint which is set for the purpose of debugging the program code of the processor by which the debugger stub itself is implemented, and a content of an instruction to which the breakpoint is set, communicates with an other debugger stub to suspend execution of a program code executed by the processor implementing the other debugger stub, when detecting that an instruction to be performed is a breakpoint, during sequential execution of the program code by the processor implementing the debugger stub iteslf, controls execution of the program code by the processor implementing the debugger stub iteslf and execution of the program code by the processors implementing the other debugger stub, while acquiring or providing the breakpoint setting information retained by each of the debugger stubs by communication with the other debugger stub, according to whether or not the debugger stub itself retains the content of the instruction to which the breakpoint is set.

Other problems and solutions thereof disclosed by the present application are disclosed in the description of Embodiments, the description of the figures, and others.

Advantageous Effects of Invention

According to the present invention, program codes can be shared among processors.

DESCRIPTION OF EMBODIMENTS

Hereinafter, embodiments of the present invention are explained with reference to the attached figures.

Figure 1:
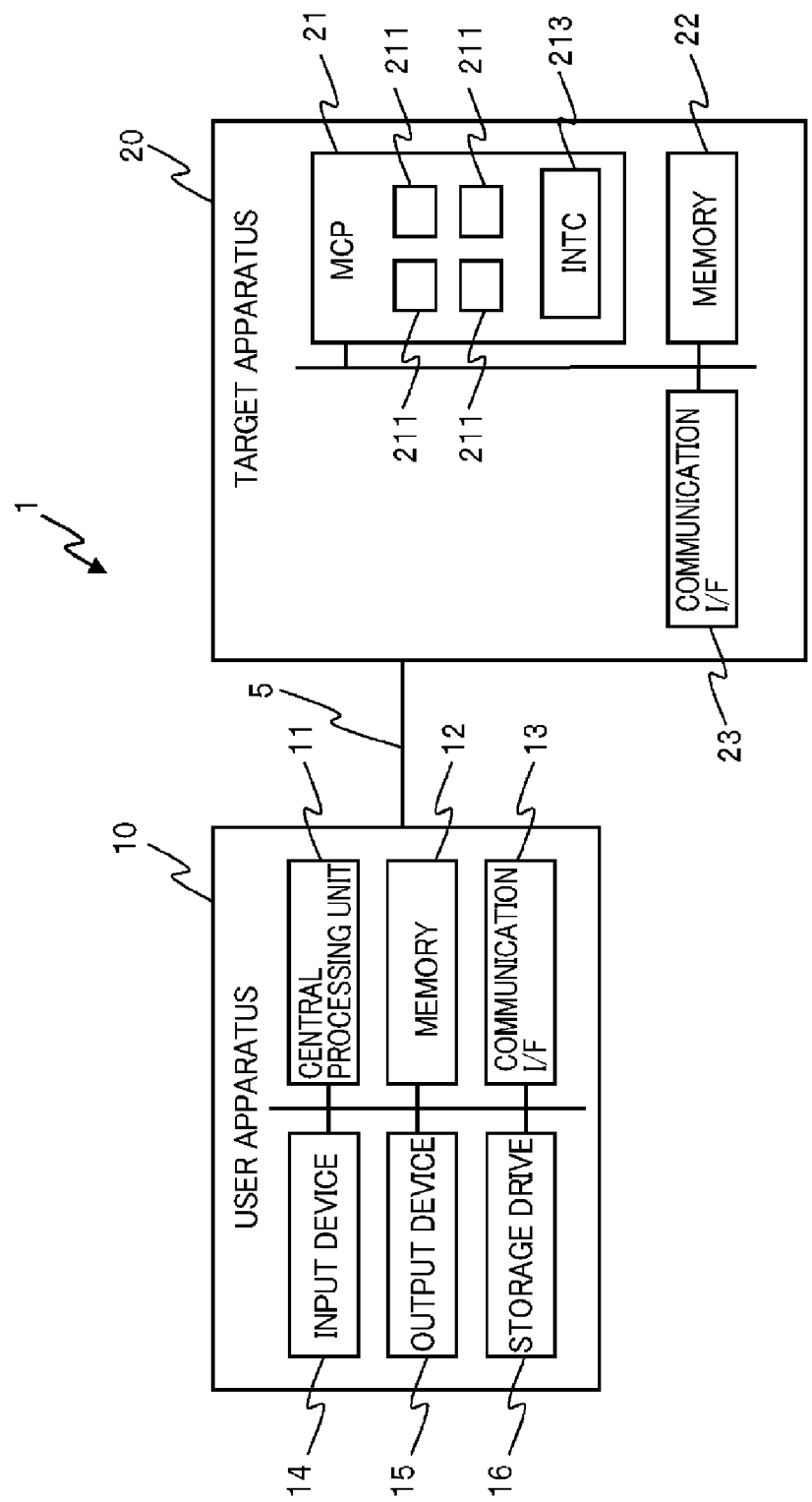
FIG. 1 is a hardware configuration of an information system 1 which is explained as an embodiment.

The hardware configuration of the information system 1 which is explained as an embodiment is shown in FIG. 1. As shown in the figure, the information system 1 includes a user apparatus 10 and a target apparatus 20. Both the user apparatus 10 and the target apparatus 20 are information apparatuses. The user apparatus 10 provides to the user a debug environment of a program which is executed in the target apparatus 20. The user apparatus 10 and the target apparatus 20 are communcatively coupled by way of a wired or wireless communication means 5.

As shown in FIG. 1, the user apparatus 10 includes a central processing unit 11, a memory 12, a communication I/F 13, an input device 14, an output device 15, and a storage drive 16. The central processing unit 11 is configured of a CPU or an MPU for example, and performs centralized control of the user apparatus 10. The memory 12 (main storage device) includes a RAM (DRAM, NVRAM, and the like) and a ROM, and stores program codes and data. The communication interface (hereinafter referred to as communication I/F 13) performs wired or wireless communication with other apparatuses. The input device 14 is a user interface such as a keyboard and a mouse. The output device 15 is a user interface such as a display (display device) and a printer (printing device). The storage drive 16 (external storage apparatus) is a hard disk drive, an SSD (Solid State Drive), and the like.

The target apparatus 20 includes an MCP (Mulch Core Processor) 21, a memory 22, and a communication interface (hereinafter referred to as a communication I/F 23). The MCP 21 is a multi-core processor of an AMP (Asymmetric Multiple Processor) configuration including a plurality of core processors (hereinafter referred to as cores 211 (corresponding to processors in the present invention)). The MCP 21 includes a memory management unit and an interrupt controller 213 (INTC (INTerrupt Controller)) which are explained later. The memory 22 includes a RAM, a ROM, and an NVRAM, and stores program codes and data. The communication I/F 23 performs wired or wireless communication with other apparatuses.

The user apparatus 10 and the target apparatus 20 may also have other configurations than the (hardware or software) configurations shown in FIG. 1. For example, if the target apparatus 20 is an embedded device, the target apparatus 20 further has a configuration for implementing other functions of the embedded device. Furthermore, if the target apparatus 20 is a component of a storage apparatus, the target apparatus 20 further has another configuration for implementing the functions of the storage apparatus.

Figure 2:
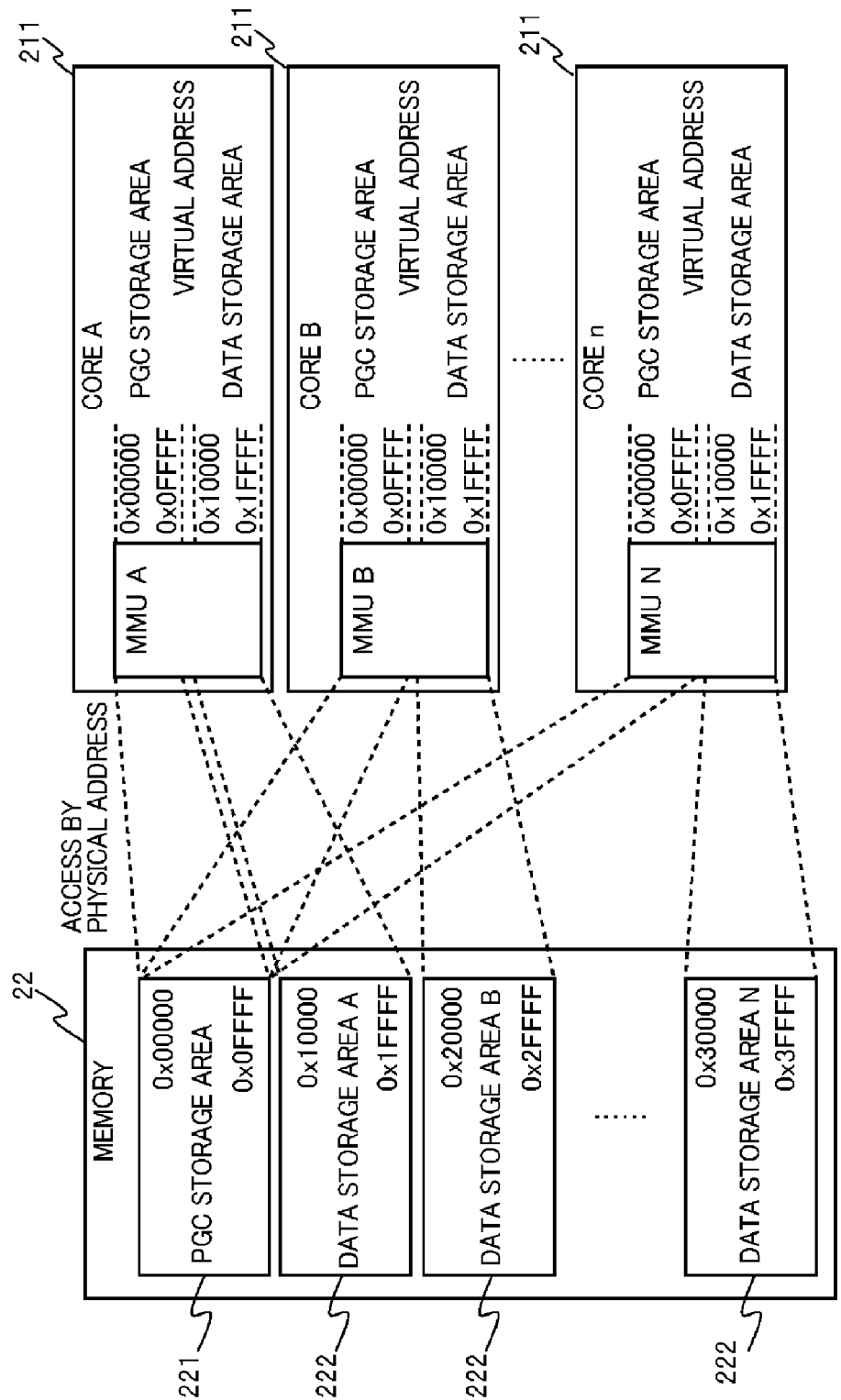
FIG. 2 is a diagram explaining the management form of program codes stored in memory 22.

FIG. 2 is a diagram explaining the management form of the program codes stored in the memory 22 of the target apparatus 20. As shown in FIG. 2, in the storage area of the memory 22, there exists a PGC storage area 221 in which the program codes utilized commonly by the cores 211 in the MCP 21 (a program code shared by the core 211, hereinafter also referred to as PGCs (ProGram Code)) is stored and a plurality of data storage areas 222 individually assigned to the respective cores 211.

As explained above, the PGC storage area 221 shared by the respective cores 211 in the MCP 21 in the AMP configuration is assigned to the memory 22 in the target apparatus 20. Furthermore, as shown in FIG. 2, a data storage area 222 is individually assigned to a respective core 211. It should be noted that the assignment of the storage areas in the memory 22 to the respective cores 211 as shown in FIG. 2 is, for example, automatically performed in accordance with assignment information stored in the NVRAM and the like when a reset sequence is executed in the target apparatus 20.

Furthermore, as shown in FIG. 2, each of the cores 211 includes a memory management unit (MMU: Memory Management Unit) (address conversion mechanism). The memory management unit performs conversion or reverse conversion of a virtual address referred to by a core 211 when a program code is executed into a physical address (real address) which specifies the storage area in the memory 22.

Figure 3:
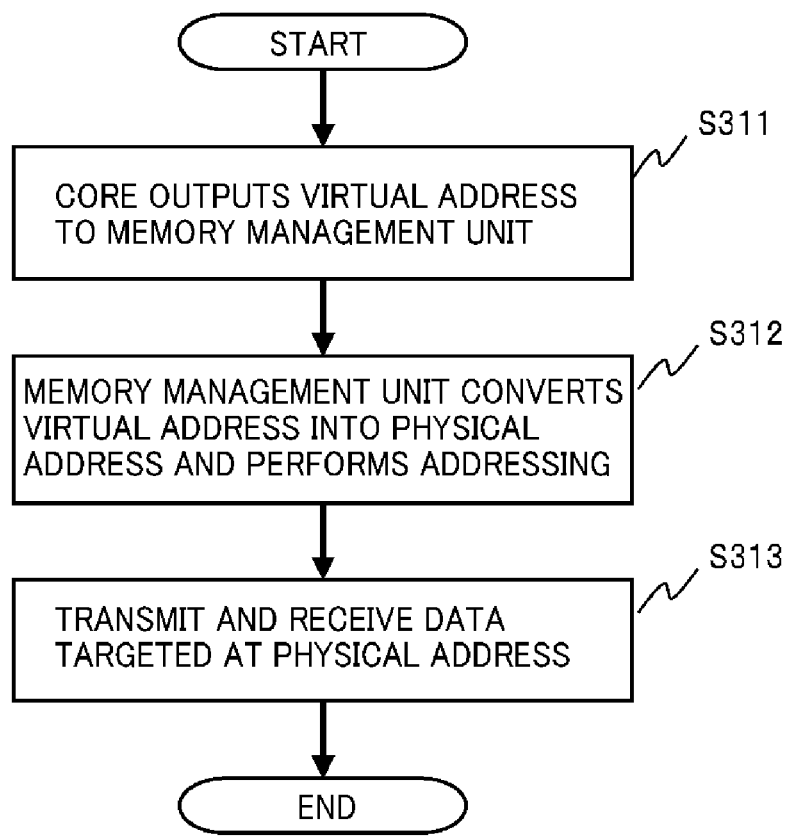
FIG. 3 is a flowchart explaining an example of a sequence in which core 211 accesses the storage area of the memory 22 when executing a program.

FIG. 3 is a flowchart explaining an example of a sequence in which a core 211 accesses the storage area of the memory 22 when executing a program code. As shown in FIG. 3, when a core 211 accesses the storage area of the memory 22, the core 211 firstly specifies a virtual address for the memory management unit (S311). Next, the memory management unit outputs a physical address corresponding to the virtual address from the address bus (S312) and, for the physical address which is addressed by the processing above, data transmission and reception is performed between the core 211 and the memory 22 by way of the data bus (S313).

Figure 4:
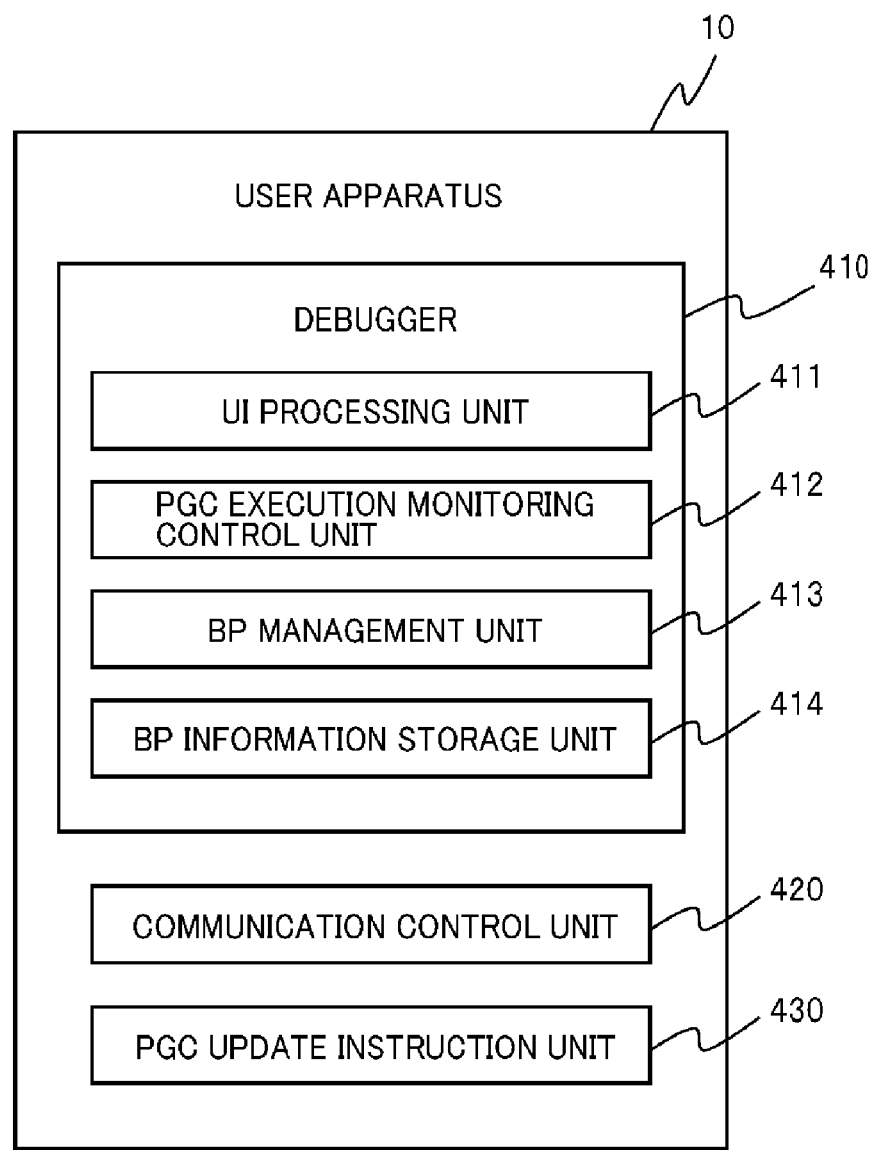
FIG. 4 is a diagram showing functions of a user apparatus 10.

FIG. 4 shows the functions of the user apparatus 10. As shown in FIG. 4, the user apparatus 10 includes a debugger 410 and a communication control unit 420. It should be noted that these functions are implemented by the central processing unit 11 in the user apparatus 10 reading and executing the program codes stored in the memory 12 or in the storage drive 16.

The debugger 410 implements a debug environment for the user to debug the program codes executed by the respective cores 211 in the target apparatus 20. A specific example of the debugger 410 is, for example, the GNU debugger GDB. As shown in FIG. 4, the debugger 410 includes a UI processing unit 411, a PGC execution monitoring control unit 412, a BP management unit 413, a BP information storage unit 414, a communication control unit 420, and a PGC update instruction unit 430.

Among the above, the UI processing unit 411 implements a user interface of a GUI (Graphical User Interface) method or of a CUI (Character User Interface) method as a debug environment.

The PGC execution monitoring control unit 412 implements functions related to program code execution monitoring and execution control by the cores 211 in the target apparatus 20.

The BP management unit 413 implements the functions related to a breakpoint (a point where the debugger 410 is made to temporarily stop execution of a program code, hereinafter referred to as a BP) which the user sets for a program code to be the target of debug.

The BP information storage unit 414 stores information related to the breakpoint which is set (hereinafter also referred to as BP information).

The communication control unit 420 implements communication with the target apparatus 20.

To the cores 211 in the target apparatus 20, the PGC update instruction unit 430 transmits instructions for updating program codes and provides updated program codes (new program codes which are explained later).

Figure 5:
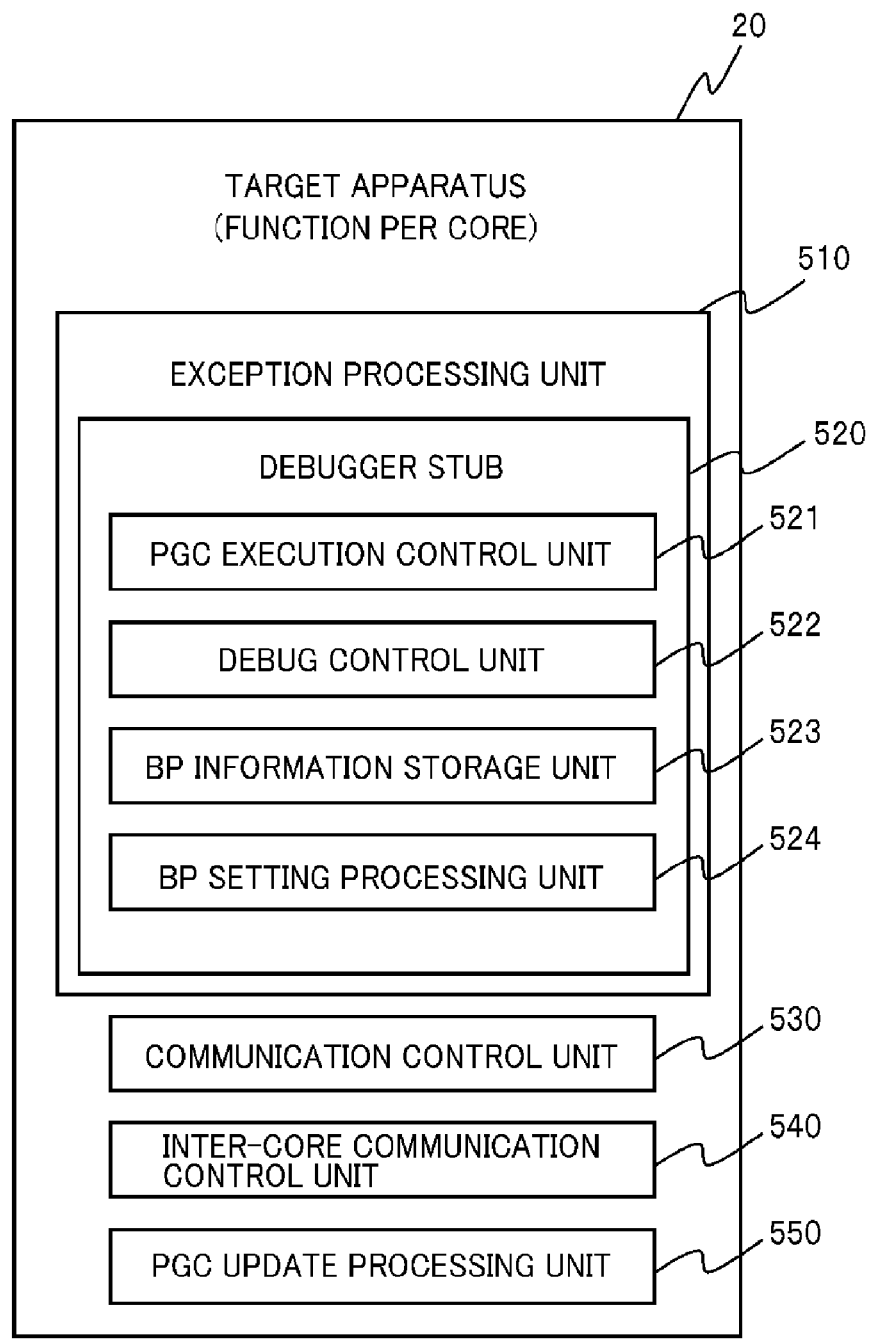
FIG. 5 is a diagram showing functions of a target apparatus 20.

FIG. 5 shows the functions of the target apparatus 20. As shown in FIG. 5, the target apparatus 20 includes an exception processing unit 510 including a debugger stub 520, a communication control unit 530, an inter-core communication control unit 540, and a PGC update processing unit 550. These functions are implemented in each of the cores 211 of the MCP 21 in the target apparatus 20. In other words, these functions are implemented by the respective cores 211 in the target apparatus 20 reading and executing program codes stored in the memory 22.

The exception processing unit 510 complements an interrupt which occurs when a core 211 execute a program code and performs processing corresponding to the cause (the cause of the interrupt) (for example, the contents of an exception handler).

In accordance with the commands transmitted from the debugger 410 in the user apparatus 10, the debugger stub 520 performs program code execution control of the cores 211, notification of the program code execution status to the user apparatus 10, and the like. As shown in the FIG. 5, the debugger stub 520 includes a PGC execution control unit 521, a debug control unit 522, a BP information storage unit 523, and a BP setting processing unit 524.

Although the debugger stub 520 is generally implemented by executing a program as part of a processing such as an undefined instruction interrupt, the debugger stub 520 may also be implemented by using hardware which the MCP 21 includes or the hardware for monitoring memory access which the MCP 21 includes. Furthermore, the debugger stub 520 may also be implemented by software as a function of a simulator or an emulator which analyzes instructions from the program code one by one and executes the above.

Generally, the debugger stub 520 is installed as the execution entity of undefined instruction interrupt processing and hardware interrupt processing which occurs when the communication control unit 530 receives a command from the user apparatus 10. Furthermore, when a method using an interrupt controller 213 is introduced as a method for realizing communication among cores 211 which is explained later, the debugger stub 520 is implemented as the execution entity of this interrupt processing. By implementing the debugger stub 520 as explained above, when a core 211 executes a program code and detects an undefined instruction, control is shifted to the debugger stub 520, and a breakpoint is detected. Furthermore, when a command for terminating the execution of a program code is received from the user apparatus 10 or when a request is issued from another core 211 during the inter-core 211 communication, it becomes possible to shift control to the debugger stub 520. Furthermore, it becomes possible to make the operation appear as if the debugger stub 520 monitors instructions, detects a breakpoint, and controls the operation of the cores 211 in accordance with the request from the external apparatus. It should be noted that the explanation below assumes that the debugger stub 520 controls the program code execution of the cores 211.

The PGC execution control unit 521 implements the functions related to program code execution control by the cores 211 in the target apparatus 20. For example, the PGC execution control unit 521 performs control for making the cores 211 execute program codes until detecting stepwise execution per instruction or a breakpoint or receiving a command for terminating the execution of the program codes from the user apparatus 10.

The debug control unit 522 controls performance of processing related to debug in accordance with commands transmitted from the debugger 410 in the user apparatus 10. For example, the debug control unit 522 refers to and changes the register values of the cores 211 and refers to and changes the values of the memory 22. Furthermore, the debug control unit 522 sets breakpoints by utilizing the BP setting processing unit 524.

The BP information storage unit 523 stores BP information which is set for the cores 211 in debugging program codes.

Figure 6:
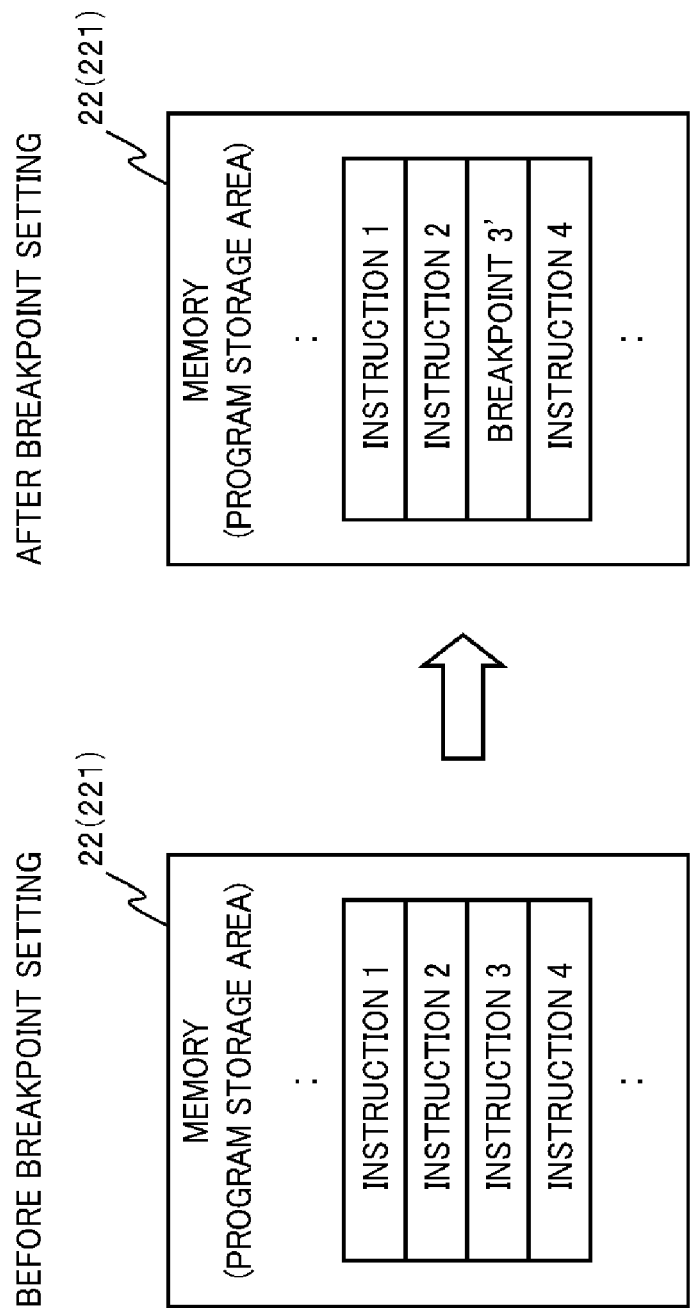
FIG. 6 is a diagram showing an example of a method for setting a breakpoint.

The BP setting processing unit 524 sets breakpoints in the program codes which the cores 211 execute in accordance with commands transmitted from the debugger 410 in the user apparatus 10. It should be noted that, as shown in FIG. 6, the setting of breakpoints is performed by replacing the contents of the instructions corresponding to the place where the breakpoints are set with specific contents (for example, an instruction which is not defined in the instruction set of the core 211 (undefined instruction)) among the description of the instructions configuring the program code (it should be noted that "instruction 3" is replaced with "breakpoint 3'" which is an undefined instruction since a breakpoint is set).

The communication control unit 530 implements communication with the user apparatus 10.

The inter-core communication control unit 540 implements communication among cores 211. It should be noted that a specific method for implementing communication among cores 211 is explained later.

Receiving a program code update instruction transmitted from the user apparatus 10, the PGC update processing unit 550 updates all or a part of the program codes stored in the PGC storage area 221 of the memory 22.

PROCESSING EXAMPLE (1)

Next, description will be given on processing related to program code debugging performed by using the information system 1 configured as explained above.

Figure 7:
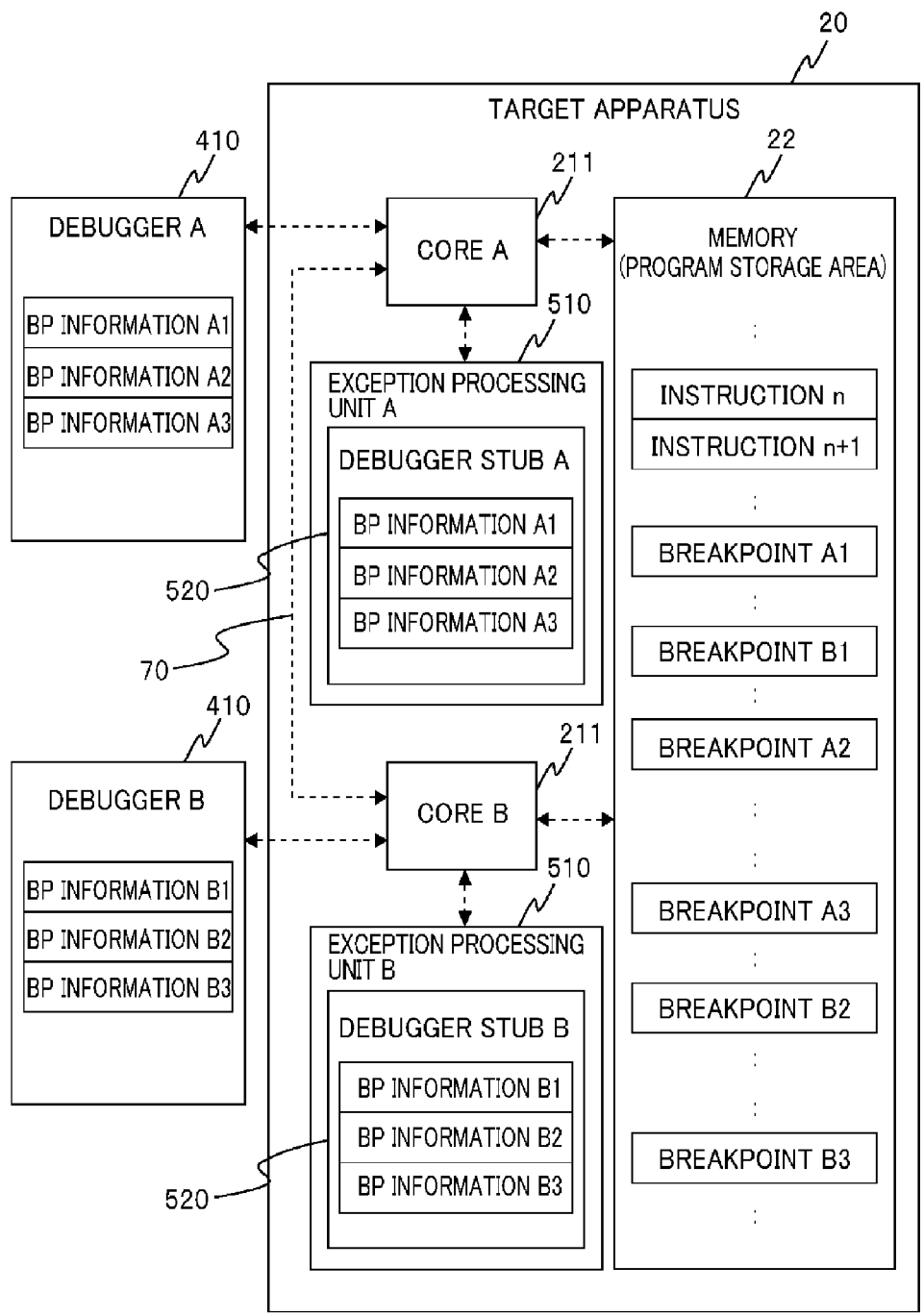
FIG. 7 is a diagram showing main components of the information system 1.

FIG. 7 is a diagram showing the main components of the information system 1 of the present embodiment related to debug. MCP 21 in the AMP configuration including two cores 211 (hereinafter referred to as core A and core B) is mounted on the target apparatus 20.

As shown in FIG. 7, in the user apparatus 10, a debugger 410 (hereinafter referred to as debugger A, debugger B) is individually operating for each of the cores 211 in the target apparatus 20. Each of the debuggers 410 may also be implemented as an instance by the software realizing the debug environment in the user apparatus 10.

As shown in FIG. 7, in the target apparatus 20, an exception processing unit 510 (hereinafter referred to as exception processing unit A, exception processing unit B) exists for each of the cores 211, and a debugger stub 520 (hereinafter referred to as debugger stub A, debugger stub B) exists for each of the cores 211.

The debugger A communicates with the debugger stub A and transmits commands to the debugger stub A, receives information transmitted from the debugger stub A, and the like. The debugger B communicates with the debugger stub B and transmits commands to the debugger stub B, receives information transmitted from the debugger stub B, and the like. Debugger A and debugger B can control each other by communication 70 among the cores 211. Furthermore, debugger A and debugger B can transmit and receive information by communication 70 among the cores 211.

When performing program code debug by using the debug environment provided by debugger A or debugger B, the user performs breakpoint setting operation as needed. When the breakpoint setting operation is performed for debugger A, debugger A controls debugger stub A to perform breakpoint setting. When the breakpoint setting operation is performed for debugger B, debugger B controls debugger stub B to perform breakpoint setting.

As explained above, when a breakpoint is set, the contents of the relevant instruction of the PGC storage area 221 in the memory 22 is replaced with specified contents (undefined instruction and the like). For example, in FIG. 7, the contents of three instructions among the instructions configuring the program codes stored in the PGC storage area 221 are replaced with breakpoint A1, breakpoint A2, and breakpoint A3 by debugger stub A. Furthermore, the contents of three instructions among the instructions configuring the program codes stored in the PGC storage area 221 are replaced with breakpoint B1, breakpoint B2, and breakpoint B3 by debugger stub B.

Debugger A and debugger B retain BP information of the breakpoints set by the user. In the case shown in FIG. 7, debugger A retains three units of BP information (BP information A1, BP information A2, and BP information A3). Furthermore, debugger B retains three units of BP information (BP information B1, BP information B2, and BP information B3). It should be noted that the entity of BP information which debugger A and debugger B retain is, for example, stored in a specified area which is secured in memory 22.

Meanwhile, debugger stub A also stores BP information of the breakpoints set by the user. In the case shown in FIG. 7, debugger stub A retains three units of BP information (BP information A1, BP information A2, and BP information A3). Furthermore, debugger stub B retains three units of BP information (BP information B1, BP information B2, and BP information B3).

Figure 8:
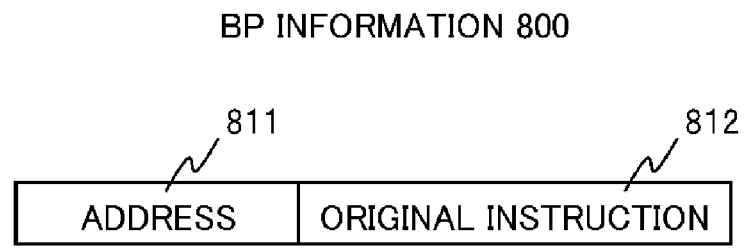
FIG. 8 is a diagram showing an example of BP information 800.

FIG. 8 is an example of BP information which the debugger 410 or the debugger stub 520 retains. As shown in the figure, in BP information 800, information indicating at least the setting location (an address 811 in the figure) of the instruction for which the breakpoint is set (the location where the relevant instruction is stored in the memory 22 (a physical address or a virtual address (in case of the debugger 410))) and the contents of an instruction (an original instruction 812) stored before the contents of the instruction are replaced with specified contents are included.

Figure 9:
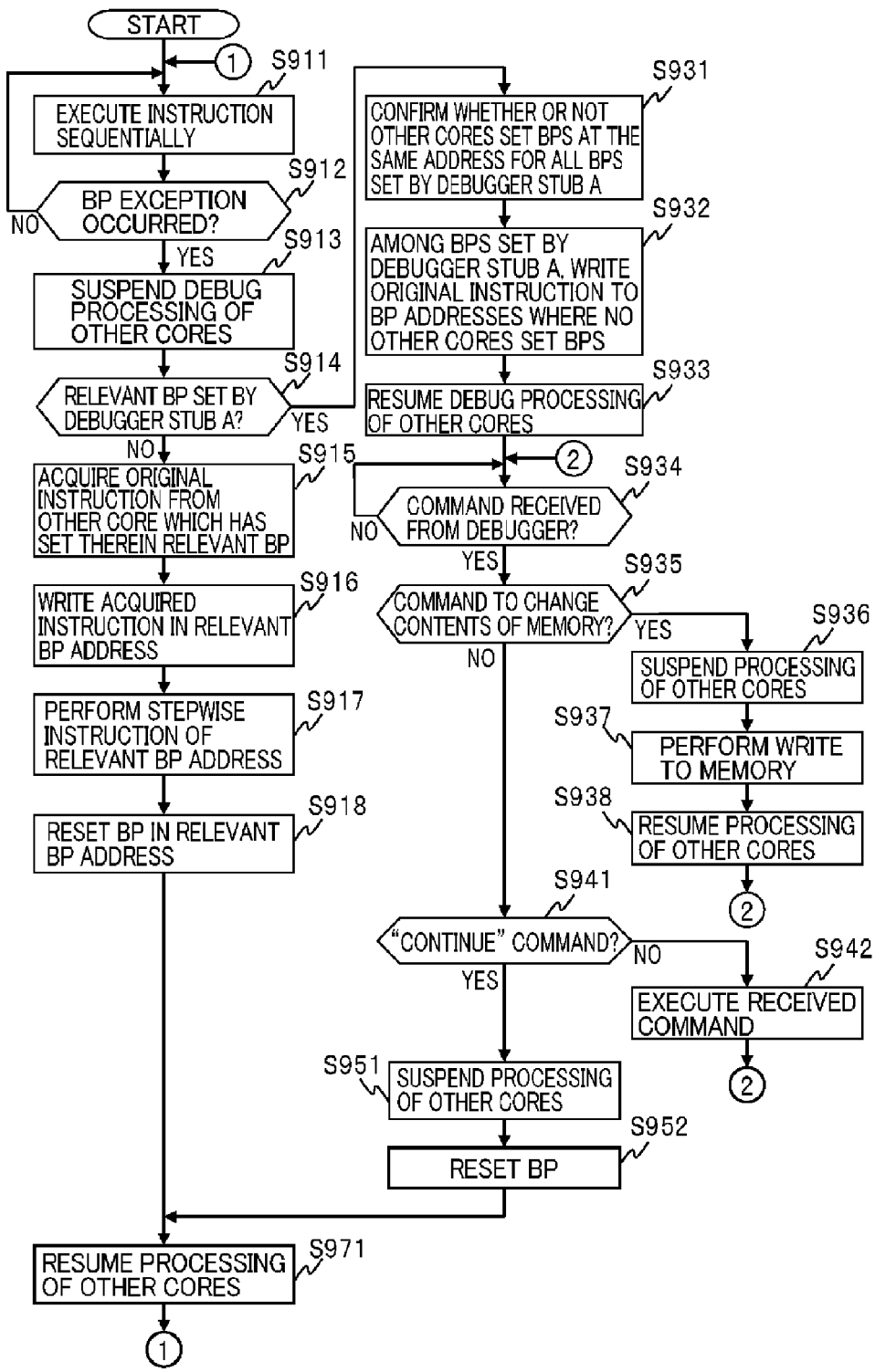
FIG. 9 is a flowchart explaining processing of core A during debug.

FIG. 9 is a flowchart explaining processing performed by core A among processings related to program code debug performed in the information system 1. Hereinafter, processing is explained with reference to the figure. It should be noted that core B performs the same processing as core A.

While the user works on a program code debug operation, debugger stub A makes core A execute instructions stored in the memory 22 in accordance with a command transmitted from debugger A (S911).

The exception processing unit A monitors whether a breakpoint was performed or not when executing the instructions of the core A (S912). It should be noted that exception processing unit A determines whether a breakpoint was performed or not, for example, based on whether the above-mentioned undefined instruction exception had occurred or not. When the exception processing unit A detects that a breakpoint had been performed (if an exception had occurred) (S912: YES), debugger stub A communicates with debugger stub B and makes debugger stub B suspend the execution of the instructions by core B (the debug operation by the debugger B related to the program code execution by core B) (S913).

Next, debugger stub A identifies the setting entity of the relevant breakpoint (S914). Identification of the setting entity is performed by checking whether or not debugger stub A has stored therein BP information 800 corresponding to the relevant setting location. The processing proceeds to S915 if the setting entity is not debugger stub A (S914: NO) and proceeds to S931 if the setting entity is debugger stub A.

At S915, debugger stub A communicates with debugger stub B and acquires the contents of the original instruction stored in the setting location of the relevant breakpoint from debugger stub B. It should be noted that debugger stub A acquires the contents of the original instruction from debugger stub B as explained above because, since the relevant breakpoint is set by debugger stub B, debugger stub A does not retain the contents of the original instruction related to the relevant breakpoint, and debugger stub B retains the contents of the original instruction.

After acquiring the contents of the original instruction, debugger stub A writes the contents of the acquired original instruction to the setting location of the relevant breakpoint (S916), and executes the instruction of the relevant setting location (stepwise execution of the relevant instruction only) (S917).

When execution of the instruction ends, debugger stub A subsequently resets a breakpoint at the setting location of the relevant breakpoint (S918). It should be noted that the breakpoint is reset because, since the relevant breakpoint had been originally set by debugger stub B (debugger B), the setting status of the breakpoint by debugger stub B (debugger B) needs to be restored before the user resumes the debug operation of core B.

After resetting the breakpoint, debugger stub A makes debugger stub B resume the debug processing of the program code (S971). Thereafter, debugger stub A returns to S911.

Meanwhile, at S931, debugger stub A communicates with debugger stub B and checks whether or not debugger stub B has set a breakpoint at the relevant setting location (whether or not debugger A and debugger B has breakpoints set for the same physical address (instruction)). This confirmation is performed by checking whether or not debugger stub B retains BP information 800 corresponding to the relevant setting location.

Next, debugger stub A rewrites the contents of the instructions of the setting locations back to the contents of the original instructions for the setting locations where debugger stub B had not set breakpoints among the breakpoints which debugger stub A had set (S932). At this point, debugger stub A acquires the contents of the original instructions from BP information 800 which debugger stub A stores. It should be noted that debugger stub B does not rewrite the contents of the instructions for which debugger stub B has set breakpoints back to the contents of the original instructions as explained above because the suspend of the instruction execution by debugger stub B is released at next step S933.

When rewriting back to the contents of the original instructions is completed, debugger stub A subsequently makes debugger stub B resume the execution of the instructions by core B which had been suspended at S913 (S933).

Next, debugger stub A stands by for a command to be transmitted from debugger A (S934). Receiving a command from debugger A (S934: YES), debugger stub A determines whether or not the received command is for changing the contents of the memory 22 (S935). Processing proceeds to S936 if the received command is for changing the contents of the memory 22 (S935: YES), and proceeds to S941 if the command is not for changing the contents of the memory 22 (S935: NO).

At S936, debugger stub A makes the debug processing by debugger stub B (execution of the instructions by core B) suspended. When confirming the suspend of the debug processing by debugger stub B, debugger stub A subsequently performs data write to the memory 22 in accordance with the received command (S937). After completion of data write, debugger stub A makes debugger stub B resume debug processing by core B (execution of instructions by core B) (S938). Subsequently, processing returns to S934.

At S941, debugger stub A determines whether or not the command received at S934 is for continuing debug processing (resuming sequential execution of instructions) (for example, a "Continue" command in GDB). The processing proceeds to S942 if the command is not for continuing debug processing (S941: NO), and proceeds to S951 if the command is for continuing debug processing (S941: YES).

At S942, debugger stub A performs processing corresponding to the received command Thereafter, processing returns to S934.

At S951, debugger stub A makes debugger stub B suspend execution of the instructions by core B, and resets breakpoints (breakpoints that debugger A accepts setting from the user at this point of time) set at this point of time (replaces the contents of the instructions at the setting locations where the breakpoints are set at this point of time with specified contents (for example, an undefined instruction) (S952). Thereafter, processing proceeds to S971.

As explained above, in the information system 1 of the present embodiment, each of the debugger stubs 520 communicates with the other debugger stubs 520 in accordance with whether or not each of the debugger stubs themselves retains the contents of the instructions to which breakpoints are set, while acquiring or providing the contents of BP information 800 which each of the debugger stubs retains, controls the execution of program codes by core 211 realizing each of the debugger stubs themselves and the execution of program codes by the cores 211 realizing the other debugger stubs 520. Therefore, in the case target apparatus 20 includes a plurality of cores 211 which are configured to share and execute program codes stored in the memory 22, a program code debug environment for each core 211 which can set breakpoints for each of the cores 211 can be realized. Furthermore, since the acquisition or provision of BP information 800 is implemented by communication 70 among the debugger stubs 520 realized by the respective cores 211, exchange of BP information 800 can be performed quickly and surely. Furthermore, this method reduces the processing load on debugger 410 in the user apparatus 10, and a comfortable debug environment can be provided to the user.

Furthermore, if not retaining the contents of the instruction where a breakpoint is set, debugger stub 520 acquires and executes the contents of the instruction from another debugger stub 520, and therefore, in the case the target apparatus 20 includes a plurality of cores 211 which are configured to share and execute the program codes stored in memory 22, a program code debug environment for each core 211 utilizing breakpoints can be realized. Furthermore, since the execution of program codes by the cores 211 realizing the other debugger stubs 520 is suspended when executing an instruction, it is possible to prevent the influence on the program code debug environment of the other cores 211 due to the release of the breakpoints set for the purpose of program code debug of the other cores 211 realizing the debugger stubs 520.

Furthermore, when retaining the contents of the instructions where breakpoints are set, debugger stub 520 communicates with the other debugger stubs 520, among the breakpoints set for the purpose of program code debug of the core 211 realizing each of the debugger stubs themselves, identifies the breakpoints whose setting locations are different from the setting locations of the breakpoints set for the purpose of program code debugging of the cores 211 which realize the other debugger stubs 520, writes the contents of the instructions that have the identified breakpoints set to each of the setting locations, thereafter communicates with the other debugger stubs 520, and resumes execution of the program code by the cores 211 which the other debugger stubs 520 realize. Therefore, while preventing influence on the program code debug environments of the other cores 211 due to the release of the breakpoints which are set for the purpose of debugging the program code of the core 211 which realizes the other debugger stubs 520, the processing related to the program code debug environment of the core 211 which realizes each of the debugger stubs themselves can be developed.

It should be noted that, although a case where the MCP 21 includes two cores 211, core A and core B, had been explained above, the description can be extended to the case where the MCP 21 includes three or more cores 211.

<Method for Implementing Inter-Core Communication>

Next, a method for implemting the communication 70 among cores 211 is explained.

Figure 10:
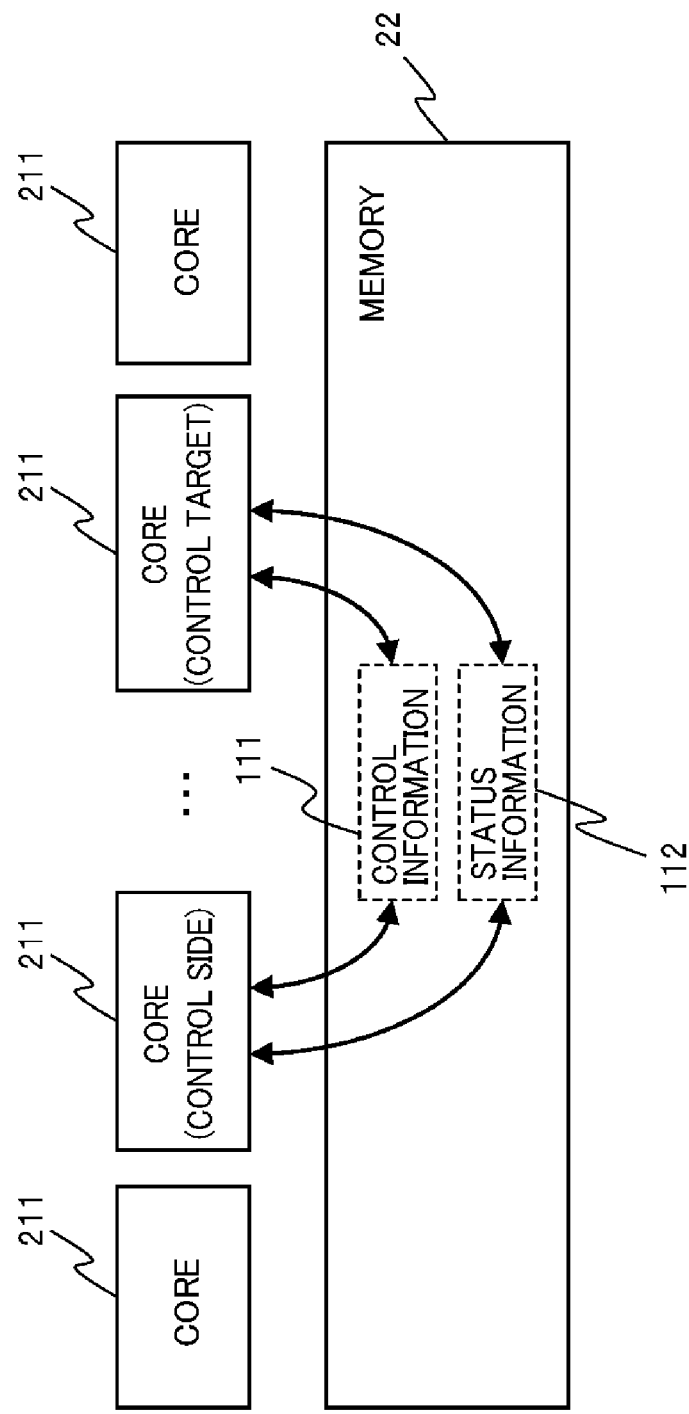
FIG. 10 is a diagram explaining an example of a method for implementing communication 70 among cores 211.

FIG. 10 is a diagram explaining an example of a method for implemting communication 70 among cores 211. In this example, communication 70 among cores 211 is implemted by way of memory 22. In this case, for a core 211 to transmit and receive information to and from another core 211, for example, a storage area for storing information transmitted and received among the cores 211 is created in the memory 22 for each of the cores 211 to access this storage area to transmit and receive information among the cores 211.

Furthermore, for a core 211 (hereinafter referred to as control side) to have the execution of instructions by another core 211 (hereinafter referred to as control target) suspended or resumed, for example, a storage area for storing information (hereinafter referred to as control information 111) instructing suspend or resumption of the instructions is created in the memory 22. THerefore the control target core 211 can refer to control information 111 at real-time which the core 211 on the control side has set in the memory 22 to perform the operation complying with the contents of the control information 111 (suspend or resumption of the instructions). Furthermore, in this case, a storage area for storing the information (hereinafter referred to as status information 112) indicating the current status of the control target is created in the memory 22 so that the core 211 on the control side can refer to the status information 112 as needed which the control target has set in the memory 22 to acquire the current status of the control target and the result of control.

Figure 11:
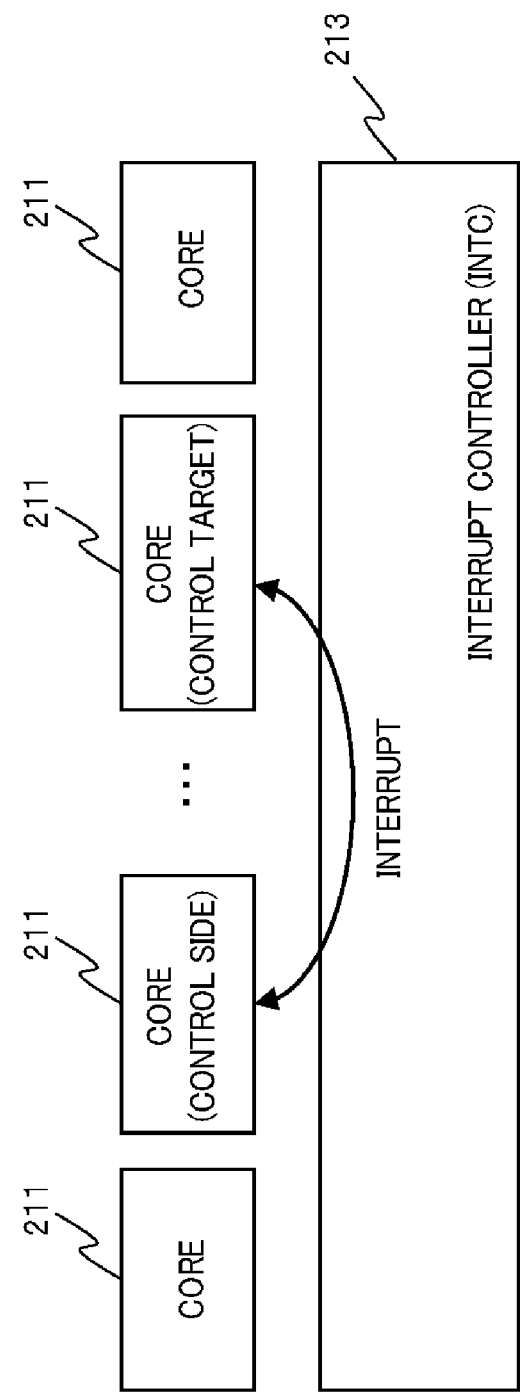
FIG. 11 is a diagram explaining an example of a method for implementing communication 70 among cores 211.

FIG. 11 is a diagram explaining another example of a method for implemting communication 70 among cores 211. In this example, communication 70 among cores 211 is implemted by using the interrupt controller 213 which the MCP 21 includes. It should be noted that the interrupt controller 213 has the function of making an interrupt occur among the cores 211 (making one core 211 interrupt another core 211).

In this case, for one core 211 (hereinafter referred to as control side) to have the execution of the instructions by another core 211 (hereinafter referred to as control target) suspended or resumed, for example, the core 211 on the control side makes an interrupt corresponding to a suspend or resumption of the execution of the instructions (in the case of resumption, for example, multiple interrupts are utilized) occur in the control target core 211 so that the control target core 211 which has detected the occurrence of this interrupt may perform suspend processing or resumption processing of the instructions of the control target core 211 as exception processing.

PROCESSING EXAMPLE (2)

In the above-described Processing Example (1), transmission and reception of information among the cores 211 and control among the cores 211 are realized by communication 70 between the cores 211. In the Processing Example (2) explained below, transmission and reception of information among cores 211 and control among cores 211 are performed among the debuggers 410 in the user apparatus 10.

Figure 12:
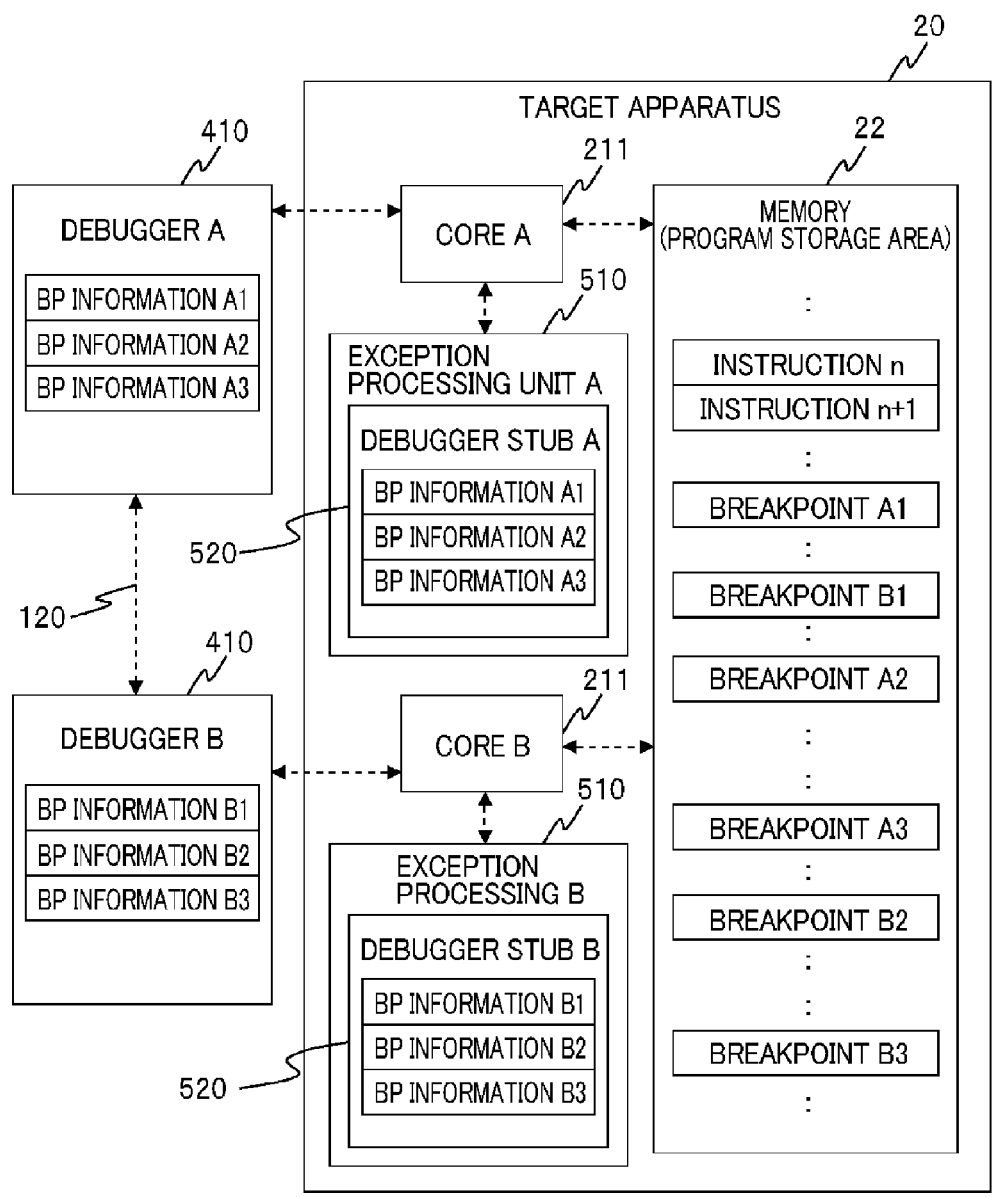
FIG. 12 is a diagram showing main components of the information system 1.

FIG. 12 is a diagram explaining the main components of the information system 1 in case of Processing Example (2). As shown in FIG. 12, although the basic configuration is the same as that in FIG. 7, differs from FIG. 7 on the point that transmission and reception of information between core A and core B and control between core A and core B are realized by communication 120 between debugger A and debugger B.

It should be noted that the methods for realizing the communication 120 between the debugger A and the debugger B are, for example, a method utilizing interprocess communication of the operating system running on the user apparatus 10, a method performing the communication by way of memory 12 and the storage drive 16 in the user apparatus 10, and the like.

Figure 13:
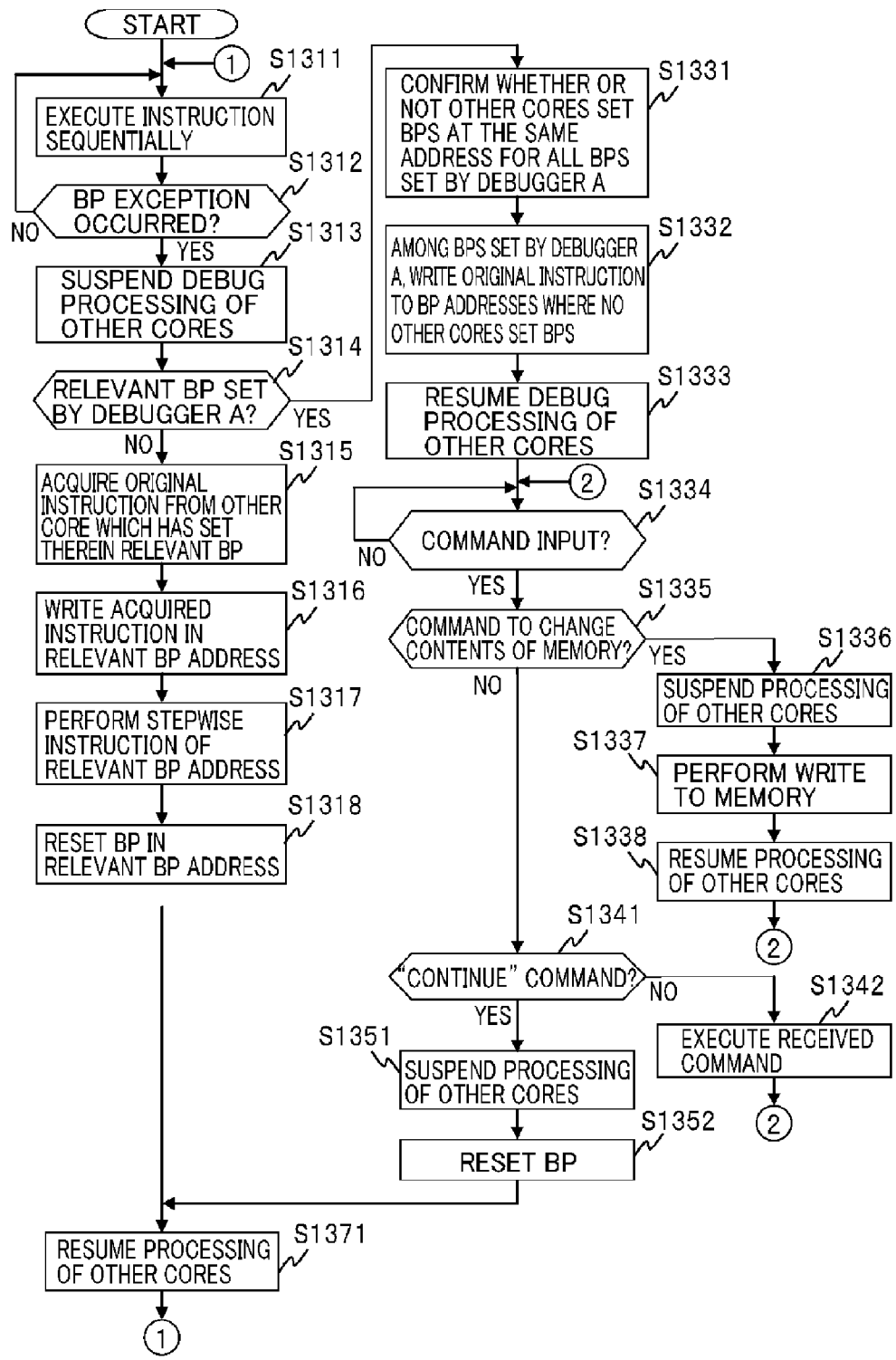
FIG. 13 is a flowchart explaining processing of core A during debug.

FIG. 13 is a flowchart explaining the processing performed by debugger A in Processing Example (2). Hereinafter, processing is explained with reference to the figure. It should be noted that debugger B performs the same processing as debugger A.

While the user works on the program code debug operation, debugger A transmits a command to the debugger stub A, controls debugger stub A, and makes core A sequentially execute the instructions (S1311).

While sequentially executing the instructions, debugger A monitors whether or not a notification informing that debugger stub A has reached the setting location of the breakpoint has been transmitted from debugger stub A (S1312). When receiving a notification from debugger stub A informing that debugger stub A has reached the setting location of the breakpoint (S1312: YES), debugger A communicates with debugger B and makes debugger B suspend execution of instructions by core B (S1313).

When confirming that execution of the instructions by core B has been suspended, debugger A subsequently identifies the setting entity of the relevant breakpoint (S1314). Identification of the setting entity is performed by checking whether or not debugger A has stored therein BP information 800 corresponding to the relevant setting location. Processing proceeds to S1315 if the setting entity is not debugger A (S1314: NO), and proceeds to S1331 if the setting entity is debugger A.

At S1315, debugger A communicates with debugger B and acquires from debugger B the contents of the original instruction stored at the setting location of the relevant breakpoint. It should be noted that debugger A acquires the contents of the original instruction from debugger B as explained above because, it is debugger B that has set the breakpoint, and so debugger A does not retain the contents of the original instruction related to the relevant breakpoint, but debugger B retains the contents of the original instruction.

After acquiring the contents of the original instruction, debugger A makes debugger stub A write the acquired contents of the original instruction to to the relevant setting location (S1316), and makes debugger stub A execute the instruction (makes debugger stub A execute the step of the relevant instruction only) (S1317).

When execution of the instruction ends, debugger A subsequently resets a breakpoint at the setting location of the relevant breakpoint (S1318). It should be noted that the breakpoint is reset because, since the relevant breakpoint had been originally set by debugger B, the setting status of the breakpoint by debugger B needs to be restored before the user resumes the debug operation of core B.

When the breakpoint is reset, debugger A makes the debugger B resume the program code debug processing (S1371). Thereafter, debugger A returns to S1311.

Meanwhile, at S1331, debugger A communicates with debugger B and checks whether or not debugger B has set a breakpoint at the relevant setting location (whether or not debugger A and debugger B set breakpoints for the same physical address (instruction)). This confirmation is performed by checking whether or not debugger B retains BP information 800 corresponding to the relevant setting location.

Next, debugger A rewrites the contents of the instructions of the setting locations back to the contents of the original instructions for the setting locations where debugger stub B had not set breakpoints among the breakpoints which the debugger A had set (S1332). At this point, debugger A acquires the contents of the original instructions from BP information 800 which debugger A stores. It should be noted that debugger A does not rewrite the contents of the instructions for which debugger B has set breakpoints back to the contents of the original instructions as explained above because the suspend of the instruction execution by debugger B is released at next step S1333.

When rewriting back to the contents of the original instructions is completed, debugger A subsequently makes debugger B resume the execution of the instructions by core B which had been suspended at S1313 (S1333).

Next, the debugger A stands by for a command to be input from the user (S1334). Accepting a command input from the user (S1134: YES), debugger A determines whether or not the accepted command is for changing the contents of the memory 22 (S1335). Processing proceeds to S1336 if the received command is for changing the contents of the memory 22 (S1335: YES), and proceeds to S1341 if the command is not for changing the contents of the memory 22 (S1335: NO).

At S1336, debugger A has the debug processing by debugger B (execution of the instructions by core B) suspended. When confirming the suspend of the debug processing by debugger B, debugger A subsequently performs data write to the memory 22 in accordance with the received command (S1337). After completing data write, debugger A makes debugger B resume debug processing of core B (execution of instructions by core B) (S1338). Subsequently, processing returns to S1134.

At S1341, debugger A determines whether or not the command received at S1334 is for continuing debug processing (resuming sequential execution of instructions) (for example, a "Continue" command in GDB). The processing proceeds to S1342 if the command is not for continuing debug processing (S1341: NO), and proceeds to S1351 if the command is for continuing debug processing (S1341: YES).

At S1342, debugger A makes debugger stub A perform processing corresponding to the received command Thereafter, processing returns to S1334.

At S1351, debugger A makes debugger B suspend execution of the instructions by core B, and resets breakpoints (breakpoints that debugger A accepts setting from the user at this point of time) set at this point of time (replaces the contents of the instructions at the setting locations where the breakpoints are set at this point of time with specified contents (for example, an undefined instruction) (S1352). Thereafter, processing proceeds to S1371.

As explained above, in Processing Example (2), each of the debuggers 410 communicates with the other debuggers 410 in accordance with whether or not each of debuggers themselves retain the contents of the instructions to which breakpoints are set, while acquiring or providing the contents of BP information 800 which each of the debuggers retains, controls the execution of program codes by core 211 in which each of the debuggers themselves are in charge of and the execution of program codes by cores 211 in which the other debuggers 410 are in charge of. Therefore, in the configuration including a plurality of cores 211 configured to share and execute program codes stored in memory 22, a program code debug environment for each of the cores 211 capable of individually setting breakpoints for each of the cores 211 can be realized. Furthermore, since the acquisition or provision of BP information 800 is implemented by communication 120 among the debuggers 410 which are in charge of debug processing of the respective cores 211, acquisition or provision of BP information 800 can be performed quickly and surely. Furthermore, by providing a communication function to debugger 410 in user apparatus 10, the configuration of debugger stub 520 in target apparatus 20 can be simplified.

<Program Code Update (1)>

In the configuration of information system 1 explained above, that is, the configuration in which each of the cores 211 in MCP 21 commonly utilizes a program code stored in PGC storage area 221 of memory 221 (refer to FIG. 1), effects on the processings performed by each of the cores 211 need to be avoided when updating the relevant program code.

Figure 14:
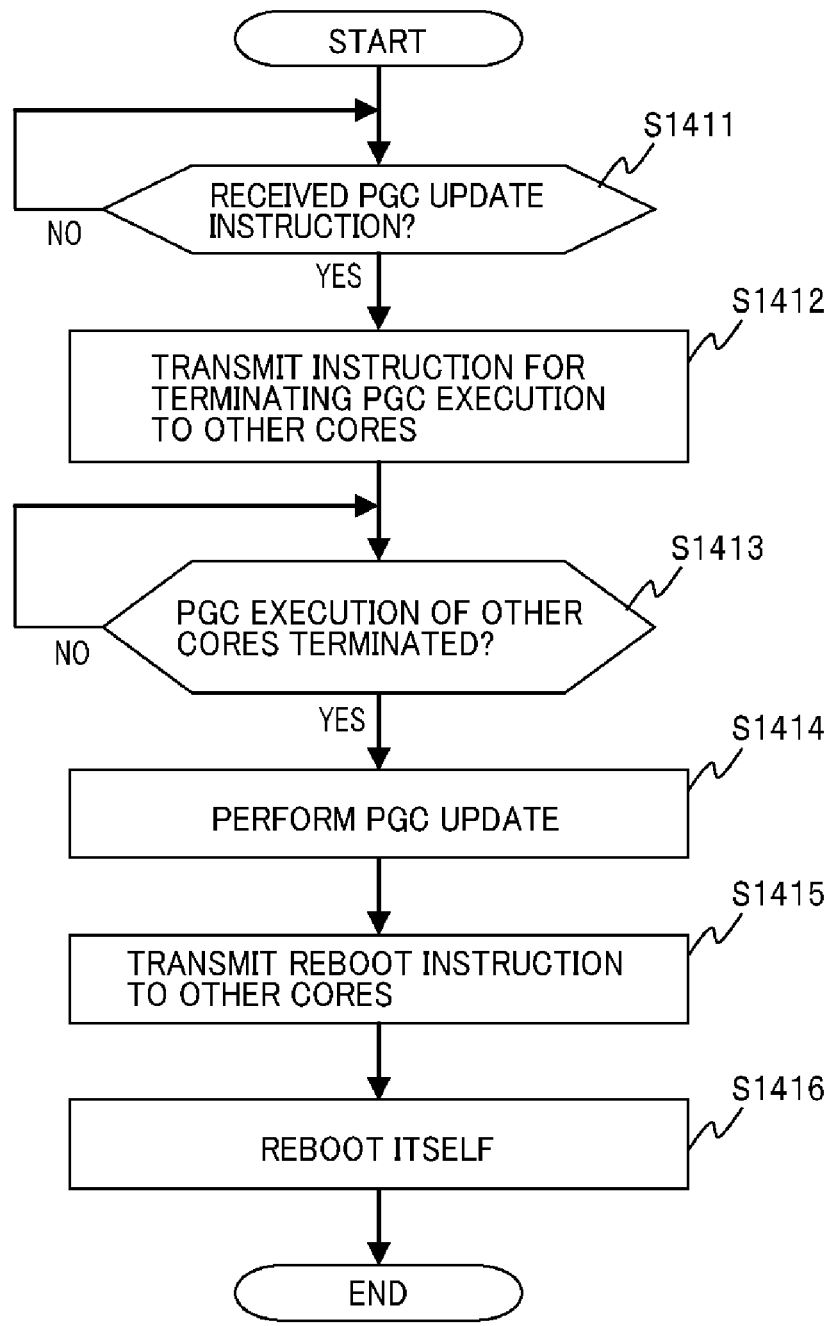
FIG. 14 is a flowchart explaining processing of updating a program code.

FIG. 14 is a flowchart explaining processing relating to updating a program code. The execution entity of the processing shown in FIG. 14 is one of a plurality of cores 211 which MCP 21 includes (hereinafter referred to as core 211 in charge of update). Hereinafter, processing is explained with reference to FIG. 14.

As shown in FIG. 14, core 211 in charge of update monitors by way of communication I/F 23 whether or not a program code update instruction (hereinafter referred to as PGC update instruction) has been issued from user apparatus 10 (S1411). When receiving a PGC update instruction from the user apparatus 10 (S1411: YES), the core 211 in charge of update transmits an instruction for terminating execution of the program code (hereinafter referred to as execution termination instruction) to the other cores 211 (S1412), and is at standby for a notification informing that execution of the program code has been terminated from the other cores 211 (hereinafter referred to as execution termination notification) (S1413). When receiving an execution termination instruction transmitted from the core 211 in charge of update, the other cores 211 complete the execution of the program code by themselves, and subsequently transmits an execution termination notification to the core 211 in charge of update. It should be noted that completing the execution of the program code means completing execution of the program code so as not to affect the tasks for the user. For example, when the target apparatus 20 is a storage apparatus, the above means terminate response processing relating to I/O requests accepted from the host apparatus.

When receiving the execution termination notices from all the other cores 211 (which share the program code) (S1413: YES), the core 211 in charge of update updates the program code stored in memory 22 (S1414). It should be noted that program code update may also be targeted to the entirety of the existing program code and may also be targeted to a part of the existing program code. Furthermore, update may be the processing of enlarging or reducing the data size of an existing program code. The core 211 in charge of update receives update differences of the program code, for example, from user apparatus 10 along with the PGC update instruction.

When completing program code update, the core 211 in charge of update subsequently transmits reboot instructions to all the other cores 211 (S1415). By this processing, the other cores 211 start executing the updated program code.

After transmitting the above-mentioned reboot instructions to all the other cores 211, the core 211 in charge of update completes execution of its own program code, and subsequently reboots the core 211 in charge of update itself, and starts executing the updated program code (S1416).

As explained above, the core 211 in charge of update completes the task of the other cores 211, terminates the execution of the program code by the other cores 211, subsequently completes the task of itself, and terminates the execution of the program code by itself to update the program code. Therefore, even when the target apparatus 20 includes a plurality of cores 211 which are configured to share and execute a program code stored in the memory 22, program code update can be performed safely and surely.

<Program Code Update (2)>

Figure 15:
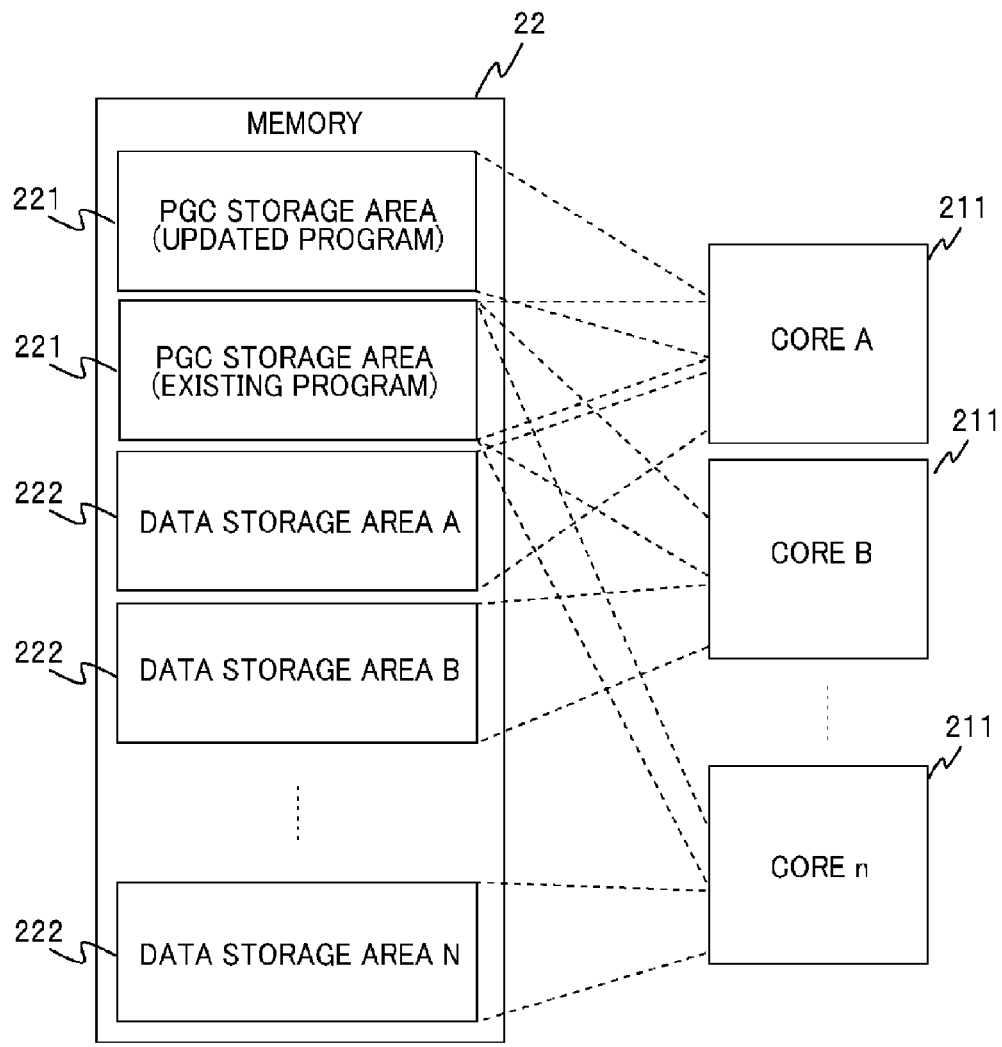
FIG. 15 is a diagram showing the storage status of program codes.

While a program code is stored in the same storage area (PGC storage area 221) in memory 22 before and after program code update in Program Code Update (1), as shown in FIG. 15, it is also possible to make the updated program code and the pre-update (existing) program code coexist in the memory 22 and update the program code by making each of the cores 211 change the read destination of the program code executed by the cores 211.

Figure 16:
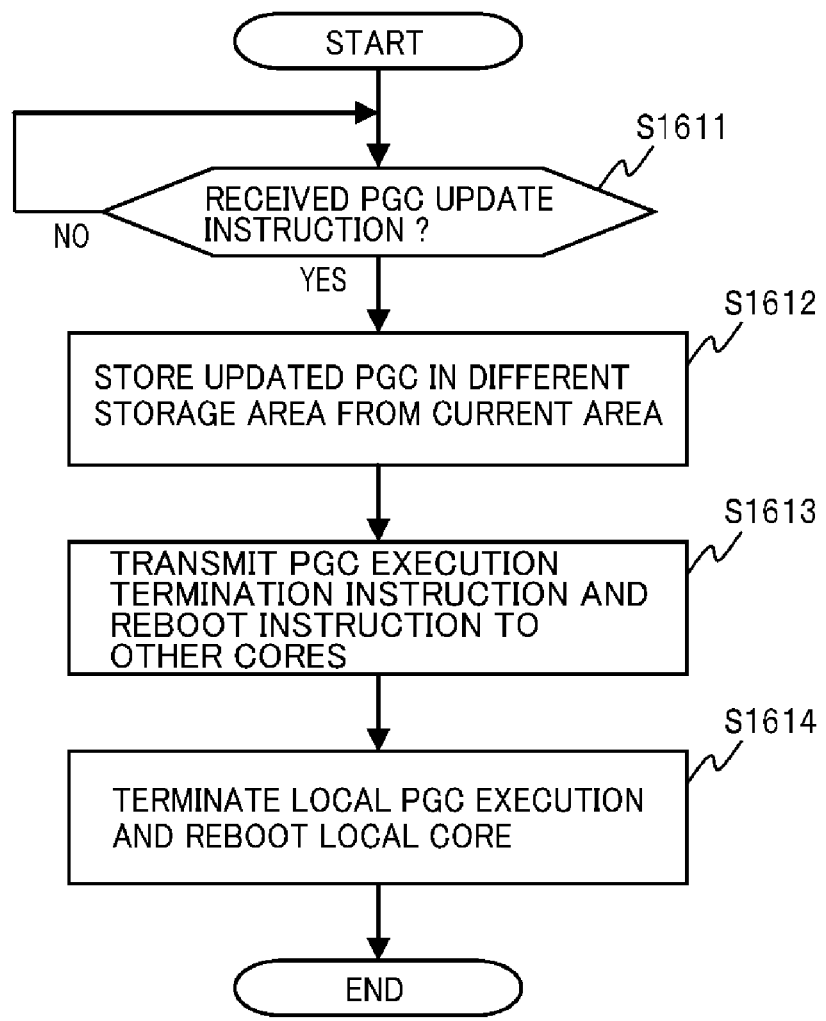
FIG. 16 is a flowchart explaining processing of updating a program code.

FIG. 16 is a flowchart explaining processing related to program code update in this case. Hereinafter, processing is explained with reference to the figure.

As in the case of Program Code Update (1), core 211 in charge of update monitors by way of communication I/F 23 whether or not a program code update instruction (PGC update instruction) has been issued from user apparatus 10 (S1611). When receiving a PGC update instruction from the user apparatus 10 (S1611:YES), core 211 in charge of update stores the updated program code in a different storage area from the storage area of memory 22 in which the existing program code is stored (S1612). Core 211 in charge of update receives the updated program code from, for example, user apparatus 10 along with the PGC update instruction. It should be noted that the updated program code may also be stored in advance in a storage area (storage area in memory 22) different from that of the pre-update program code (storage area in memory 22).

Next, core 211 in charge of update transmits execution termination instructions, and reboot instructions by the updated program code, to the other cores 211 (may be a part of the other cores 211) (S1613). In this way, the other cores 211 complete their operations and reboot the cores 211 themselves assuming the updated program code to be the read destination. It should be noted that the other cores 211, for example, acquire the storage location of the updated program code (the address indicating the storage location of the updated program code in memory 22) from core 211 in charge of update when these instructions are issued.

Next, after transmitting execution termination instructions and reboot instructions to the other cores 211, core 211 in charge of update completes its own task, subsequently reboots core 211 itself with the updated program code, and starts the execution of the updated program code (S1614).

As explained above, since cores 211 in charge of update stores an updated program code in a storage area different from that in which the existing program code is stored in advance, and subsequently transmits execution termination instructions and reboot instructions to the other cores 211, it is not necessary for the cores 211 to terminate the program code execution for performing program code update (although it is necessary to make the other cores 211 wait during processing S1414 in FIG. 14 in Program Code Update (1)). This allows to reduce the time during which the program code execution by the cores 211 is terminated.

It should be noted that, for example, if the other cores 211 to which core 211 in charge of update transmits execution termination instructions and reboot instructions by the updated program code at S1613 are limited to a part of the cores 211, it is also possible to make cores 211 executing the pre-update program code and the cores 211 executing the updated program code coexist. Therefore the above can be applied to, for example, for cores 211 to which an updated program code need not be applied, it is not necessary to perform execution termination or reboot so service for cores 211 not relating to the cores 211 to which the updated program code need to be applied is possible.

<Program Code Protection>

Figure 17:
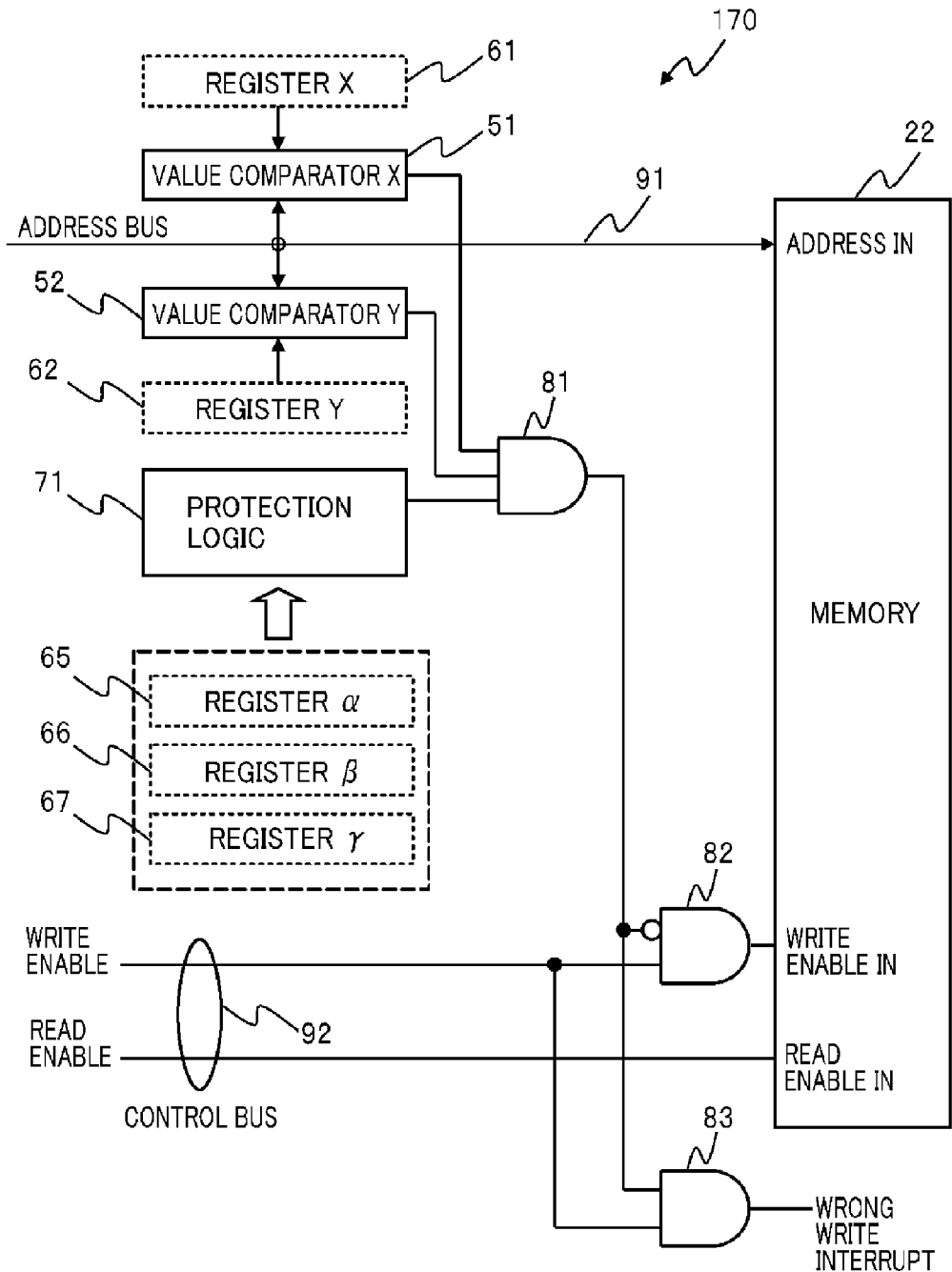
FIG. 17 is a diagram showing an example of logic circuit 170.

In the form where a plurality of cores 211 share a program code stored in memory 22, if the contents of the program code of a core 211 is rewritten due to thermal runaway, a bug, and the like, processing of all other cores 211 will be affected. Therefore, a mechanism of appropriately protecting the program code stored in memory 22 is necessary so that the contents of the program code may not be carelessly changed. Therefore, for example, logic circuit 170 shown in FIG. 17 is interposed between the MCP 21 and the memory 22 to protect the program code appropriately. In FIG. 17, address bus 91 is an address signal line which connects an address signal output port (Address in) of the MCP 21 and an address signal input port of memory 22. When MCP 21 accesses a storage area of memory 22, an address signal which specifies the storage area of the access destination flows through address bus 91.

Control bus 92 is a control signal line which connect a control signal output port of MCP 21 and a control signal input port of memory 22 (write control signal input port (Write enable in), read control signal input port (Read enable in)). Control signals (write control signal, read control signal) flow through control bus 92 when MCP 21 accesses a storage area of memory 22.

Value comparator X 51 compares a value stored in register X 61 (this value is hereinafter referred to as "X") with an address value specified by an address signal flowing through address bus 91 and outputs "1" when the address value is equal to or greater than "X", or outputs "0" if the address value is less than "X". It should be noted that a head address of the storage area to be the protection target (for example, head address of PGC storage area 221) is set for register X 61.

Value comparator Y 52 compares a value stored in register Y 62 (this value is hereinafter referred to as "Y") with an address value specified by an address signal flowing through address bus 91 and outputs "1" when the address value is equal to or less than "Y", or outputs "0" when the address value is greater than "Y". It should be noted that an end address of the storage area to be the protection target (for example, end address of PGC storage area 221) is set for register Y 62.

Protection logic 71 performs processing explained later with reference to register alpha 65, register beta 66, and register gamma 67, and outputs "1" (protect) or "0" (release protect) in accordance with the result thereof.

For a 3-input AND gate 81, the output of the value comparator X 51, the output of the value comparator Y 52, and the output of the protection logic 71 are input, and the output thereof is supplied to an AND gate 82 and an AND gate 83.

For a 2-input AND gate 82, a value obtained by inverting the value output from the AND gate 81 and a write control signal of control bus 92 ("1" (written), "0" (not written)) are input, and the output is input to the write control signal input port (Write enable in) of memory 22. It should be noted that a read control signal of control bus 92 ("1" (read), "0" (no read)) is input to the read control signal input port (Read enable in) of memory 22.

For 2-input AND gate 83, the output of AND gate 81 and a write control signal of control bus 92 are input, and the output thereof is input to the interrupt control signal input port of MCP 21 for controlling invalid write to memory 22. It should be noted that write to memory 22 is prohibited regardless of the write control signal while "1" is input in the interrupt control signal input port and that write to the memory 22 is allowed if the write control signal is "1" (written) while "0" is input to the interrupt control signal input port.

Figure 18:
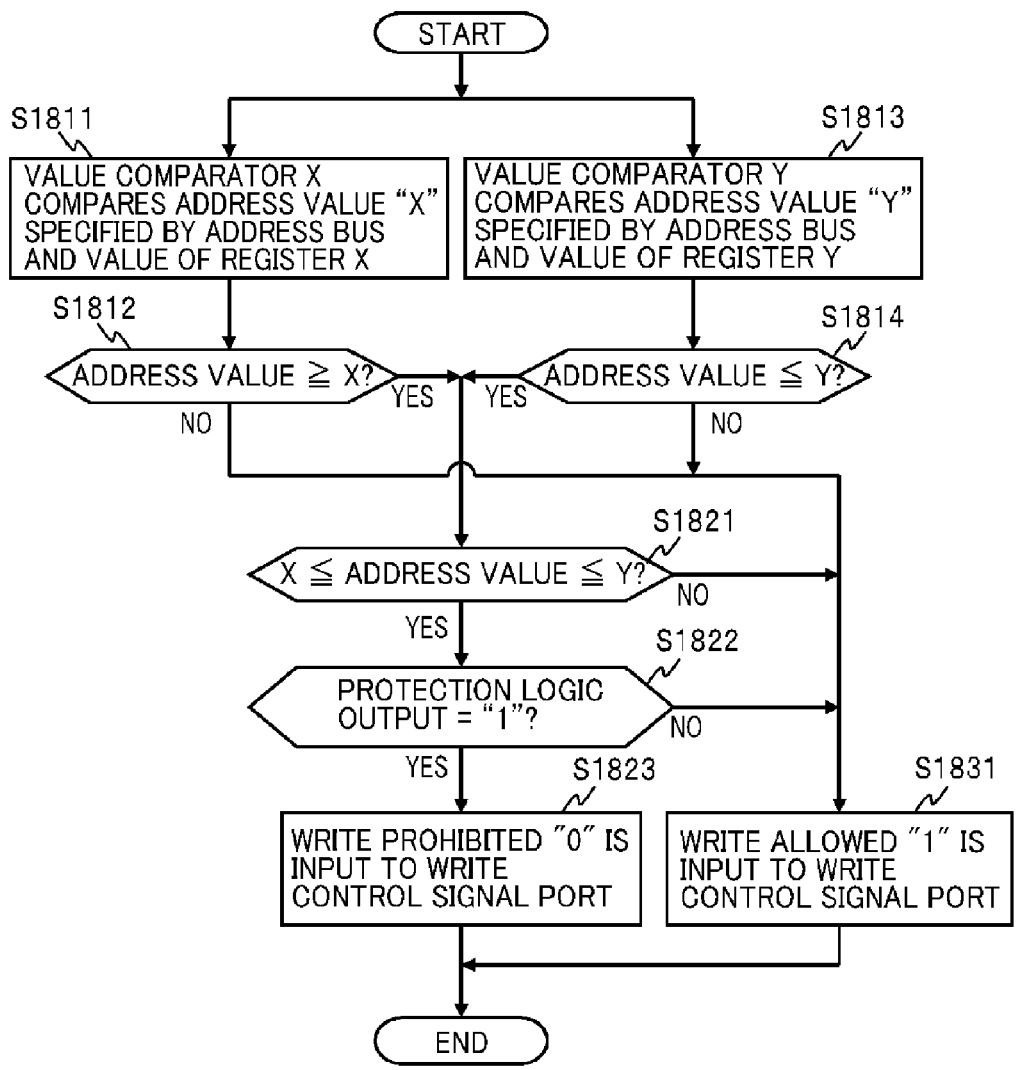
FIG. 18 is a flowchart explaining an operation of the logic circuit 170.

FIG. 18 is a flowchart explaining the operation of logic circuit 170 shown in FIG. 17. It should be noted that the operations shown in FIG. 17 are performed each time memory 22 is accessed from MCP 21. Hereinafter, processing is explained with reference to FIG. 17.

Firstly, value comparator X 51 compares value "X" stored in register X 61 with an address value specified by an address signal that flows through address bus 91 (S1811). If the address value is equal to or greater than "X" (S1812: YES), value comparator X 51 outputs "1" and the processing proceeds to S1821 while, if the address value is smaller than "X" (S1812: NO), value comparator X 51 outputs "0" and the processing proceeds to S1831.

The value comparator Y 52 compares value "Y" stored in register Y 62 with an address value specified by an address signal that flows through address bus 91 (S1813). If the address value is equal to or less than "Y" (S1814: YES), value comparator Y 52 outputs "1" and the processing proceeds to S1821 while, if the address value is larger than "Y" (S1814: NO), value comparator Y 52 outputs "0" and the processing proceeds to S1831.

If the output of value comparator X 51 and the output of value comparator Y 52 are both "1" (that is, the address value being equal to or greater than X as well as being equal to or less than Y) (S1821: YES) and the output of the protection logic 71 is "1" (protect) as well (S1822: YES), AND gate 81 outputs "1". Therefore, in this case, the output of AND gate 82 is "0" (write prohibited), and "0" (write prohibited) is input to the write control signal port of memory 22 regardless of the status of the write control signal (S1823).

Meanwhile, if either the output of value comparator X 51 or the output of value comparator Y 52 is "0" (S1812: N0, S1814: N0, S1821: NO), or if the output of protection logic 71 is "0" (S1822: NO), AND gate 81 outputs "0", and the output of AND gate 82 is "1" in this case. Therefore, in this case, if the write control signal from MCP 21 is "1" (written), "1" (write allowed) is input to the write control signal port of memory 22 (S1831).

<Operation of Protection Logic>

If MCP 21 accesses register alpha 65, register beta 66, and register gamma 67 by a specified procedure, protection logic 71 outputs "0" (release protect) while, if MCP 21 accesses the registers by other procedures than the above, protection logic 71 outputs "1" (protect). It should be noted that the above-mentioned register alpha 65, register beta 66, and register gamma 67 are, for example, the storage areas for which data write and data read to and from MCP 21 can be performed. Register alpha 65, register beta 66, and register gamma 67 are implemented, for example, by using storage area of memory 22. Furthermore, the address values (respectively referred to as address alpha, address beta, and address gamma) which MCP 21 specifies when accessing the register alpha 65, the register beta 66, and the register gamma 67 have a magnitude relationship of address alpha<address beta<address gamma.

Figure 19:
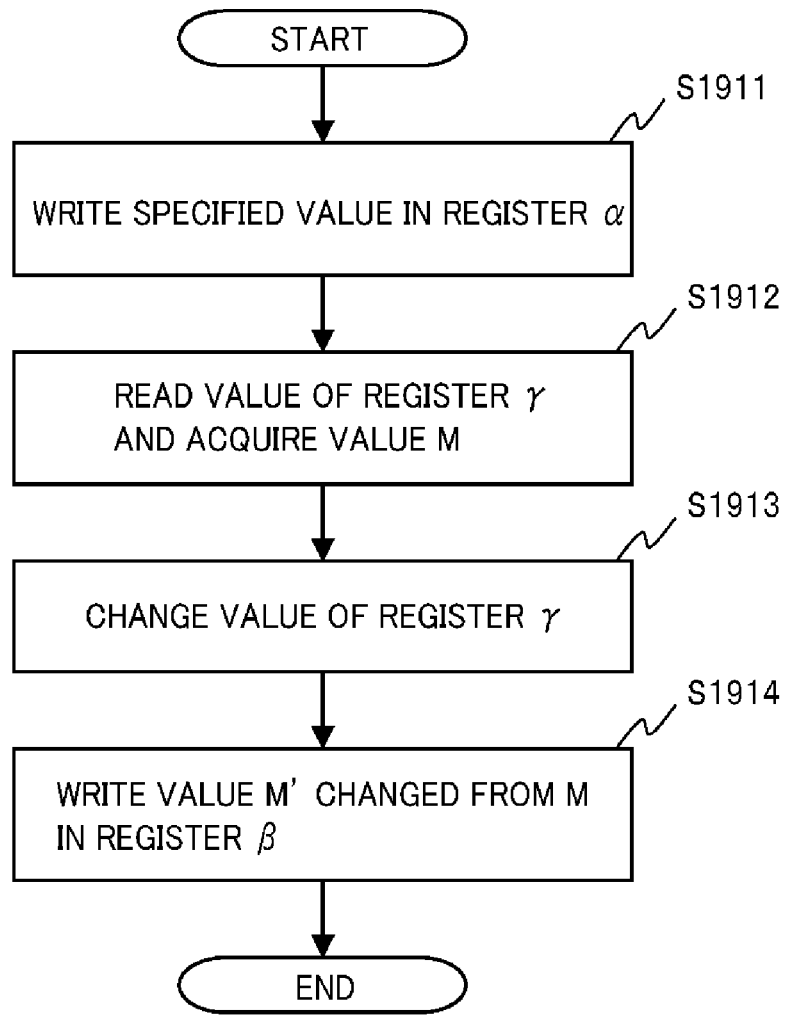
FIG. 19 is a flowchart explaining an example of a specified algorithm

FIG. 19 is an example of the above-mentioned specified procedure. In this example, MCP 21 is made to firstly perform data write or data read in the order of register alpha 65, register gamma 67 and, register beta 66. Specifically speaking, MCP 21 firstly writes a value to register alpha 65 (S1911), secondly reads a value stored in register gamma 67, as well as acquires a specified value M from protection logic 71 (S1912), and subsequently changes the value of register gamma 67 (S1913). In addition, MCP 21 performs a specified arithmetic operation for the specified value M acquired at S1912 (for example, bit invert or value addition and subtraction), ascertains an arithmetic operation value M', and writes the ascertained value M' to register beta 66 (S1914).

At this point, if an abnormality occurs in the operation of MCP 21 due to thermal runaway, a bug, and the like, it is empirically known that sequential access often occurs in one direction of the address values (ascending order or descending order) from MCP 21 to memory 22. Therefore, if a procedure to set the output of protection logic 71 to "0" (releasing program code protection) is made a procedure including non one-way access from MCP 21 to memory 22 (access is performed in order of register alpha 65, register gamma 67, and register beta 66 in FIG. 19), program code protection can be prevented from being carelessly released.

Figure 20:
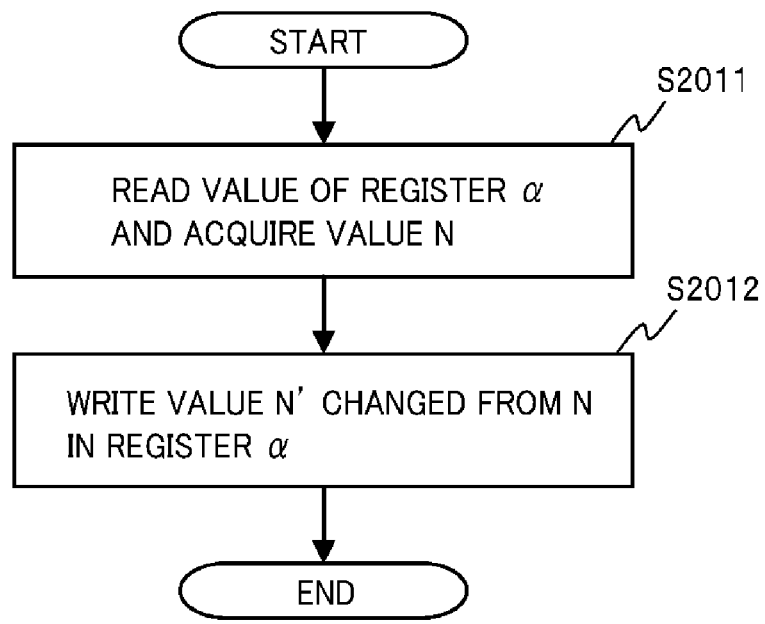
FIG. 20 is a flowchart explaining an example of an algorithm besides the specified algorithm.

Meanwhile, opposite to the above, FIG. 20 is an example of a procedure for enabling program code protection. In this example, MCP 21 is made to perform data read and data write for register alpha 65. Specifically speaking, MCP 21 firstly reads a value of register alpha 65, as well as acquires a specified value N from protection logic 71 (S2011), performs a specified arithmetic operation for the specified value N acquired at S2011 (for example, bit invert or value addition and subtraction), ascertains an arithmetic operation value N', and writes the ascertained value N' to register alpha 65 (S2012). It should be noted that the procedure for enabling program code protection may also be in a simplified configuration compared with the procedure (the procedure in FIG. 19) for releasing program code protection.

Figure 21:
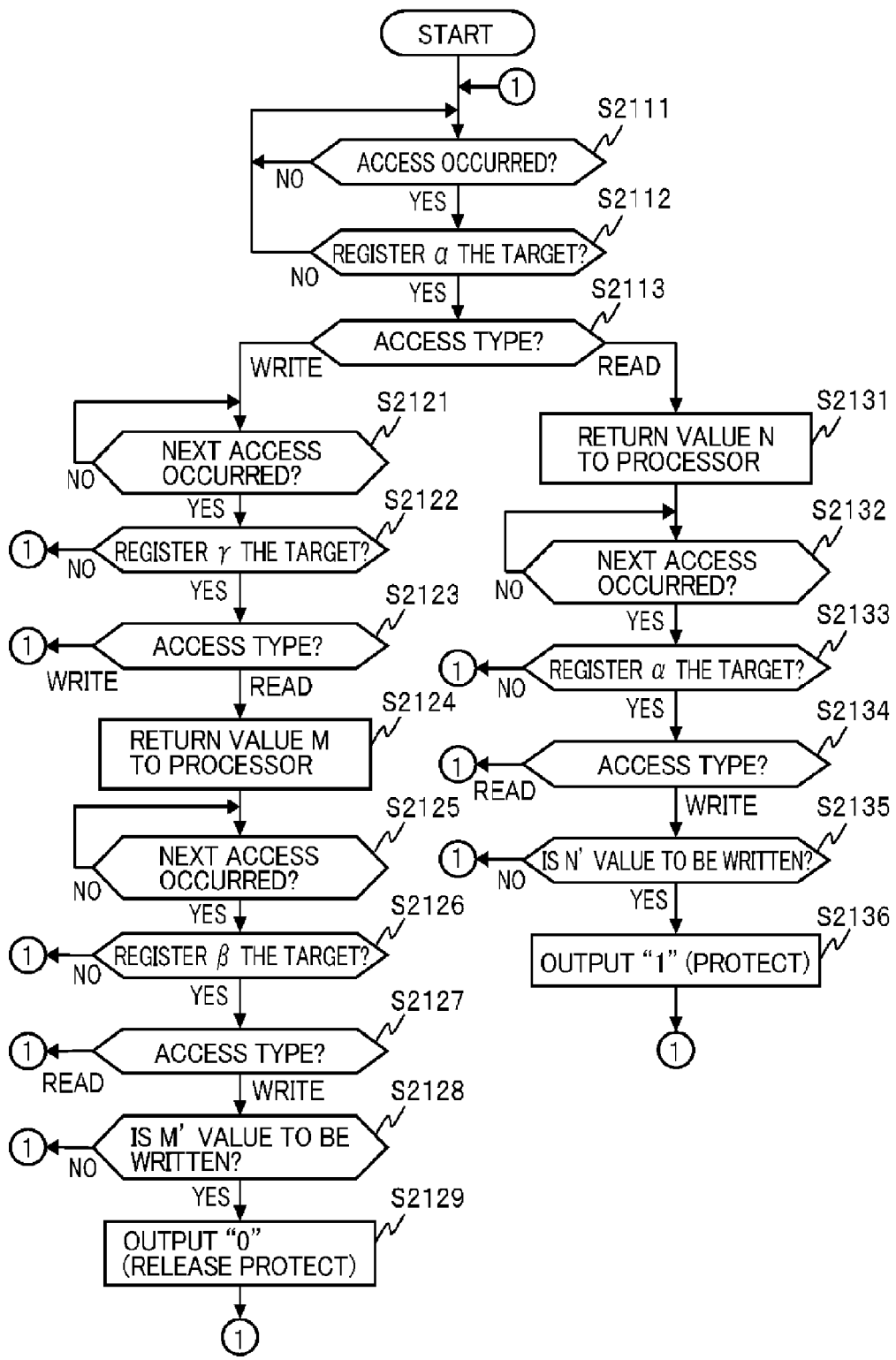
FIG. 21 is a flowchart explaining processing of protection logic 71.

FIG. 21 is a flowchart explaining the processing which protection logic 71 performs when MCP 21 accesses register alpha 65, register beta 66, and register gamma 67 in the procedure shown in FIG. 19 or FIG. 20.

Protection logic 71 monitors whether or not any of register alpha 65, register beta 66, and register gamma 67 is accessed from the MCP 21 (S2111). When detecting that MCP 21 had accessed any of register alpha 65, register beta 66, and register gamma 67 (S2111: YES), protection logic 71 determines whether or not the access destination thereof is register alpha 65 (S2112). It should be noted that this processing corresponds to S1911 in FIG. 19 or S2011 in FIG. 20.

Processing proceeds to S2113 if the access destination of MCP 21 is register alpha 65 (S2112: YES), and returns to S2111 if the access destination is not register alpha 65 (S2112: NO) (because the procedure is not any of those in FIG. 19 and FIG. 20).

At S2113, protection logic 71 determines whether the access type is data write to register alpha 65 or data read from register alpha 65 (S2113). It should be noted that this processing corresponds to S1911 in FIG. 19 or S2011 in FIG. 20.

Processing proceeds to S2121 if the access type is data write (S2113: Write) (because this can be a procedure in FIG. 19), or proceeds to S2131 if the access type is data read (S2113: Read) (because this can be a procedure in FIG. 20).

In FIG. 21, the processings from S2121 to S2129 corresponds to the case of releasing program code protection (FIG. 19) while the processings from S2131 to S2136 corresponds to the case of enabling program code protection (FIG. 20).

At S2121, protection logic 71 monitors whether or not any of register alpha 65, register beta 66, and register gamma 67 is accessed from MCP 21. If detecting that MCP 21 has accessed any of register alpha 65, register beta 66, and register gamma 67 (S2121: YES), protection logic 71 determines whether or not the access destination thereof is register gamma 67 (S2122). It should be noted that this processing corresponds to S1912 in FIG. 19. Processing proceeds to S2123 if the access destination is register gamma 67 (S2122: YES) (because this can be a procedure in FIG. 19), or returns to S2111 if the access destination is not register gamma 67 (S2122: NO).

At S2123, protection logic 71 determines whether the access type is data write or data read. It should be noted that this processing corresponds to S1912 in FIG. 19. Processing proceeds to S2124 if the access type is data read (S2123: Read) (because this can be a procedure in FIG. 19), or returns to S2111 if the access type is data write (S2123: Write).

At S2124, protection logic 71 returns the specified value M to MCP 21 as well as stores the value (for example, stores the value in a dedicated register or in memory 22). This processing corresponds to S1912 in FIG. 19. It should be noted that the specified value M should preferably change each time register alpha 65, register beta 66, or register gamma 67 are accessed, for example, protection logic 71 determines specified value M based on a random number value or the number of times the registers (register alpha 65, register beta 66, and register gamma 67) are accessed.

Next, protection logic 71 monitors whether or not any of register alpha 65, register beta 66, and register gamma 67 is accessed from MCP 21 (S2125). If detecting that MCP 21 has accessed any of register alpha 65, register beta 66, and register gamma 67 (S2125: YES), protection logic 71 determines whether or not the access destination thereof is register beta 66 (S2126). It should be noted that this processing corresponds to S1914 in FIG. 19.

Processing proceeds to S2127 if the access destination is register beta 66 (S2126: YES) (because this can be a procedure in FIG. 19), and returns to S2111 if the access destination is not register beta 66 (S2126: NO).

At S2127, protection logic 71 determines whether the access type is data write or data read. It should be noted that this processing corresponds to S1914 in FIG. 19.

Processing proceeds to S2128 if the access type is data write (S2127: Write) (because this can be a procedure in FIG. 19), and returns to S2111 if the access type is data read (S2127: Read).

At S2128, protection logic 71 performs a specified arithmetic operation for specified value M stored at S2124 (for example, bit invert or value addition and subtraction), ascertains an arithmetic operation value M', and determines whether or not the value which MCP 21 is about to write to register beta 66 (at S1914) matches the arithmetic operation value M'. It should be noted that the algorithm of the above-mentioned arithmetic operation in which protection logic 71 ascertains arithmetic operation value M' based on the specified value M matches the algorithm in which MCP 21 ascertains arithmetic operation value M' based on specified value M.

Protection logic 71 outputs "0" (release protect) if the value which MCP 21 is about to write to register beta 66 matches arithmetic operation value M' (S2128: YES) (because this matches the processing of FIG. 19 (the specified procedure)), and returns to S2111 if the value which MCP 21 is about to write to register beta 66 does not match arithmetic operation value M' (S2128: NO).

Meanwhile, at S2131, protection logic 71 returns specified value N to MCP 21 and stores the value as well (for example, stores the value in a dedicated register or in memory 22). This processing corresponds to S2011 in FIG. 20. It should be noted that this specified value N should preferably be a value that changes each time register alpha 65, register beta 66, or register gamma 67 are accessed, for example, protection logic 71 determines the specified value N based on a random number or the number of times the registers (register alpha 65, register beta 66, and register gamma 67) are accessed.

Next, protection logic 71 monitors whether or not any of register alpha 65, register beta 66, and register gamma 67 is accessed from MCP 21 (S2132). When detecting that MCP 21 has accessed any of register alpha 65, register beta 66, and register gamma 67 (S2132: YES), protection logic 71 determines whether the access destination thereof is register alpha 65 or not (S2133). It should be noted that this processing corresponds to S2011 in FIG. 20.

Processing proceeds to S2134 if the access destination is register alpha 65 (S2133: YES) (because this can be the procedure in FIG. 20), and returns to S2111 if the access destination is not register alpha 65 (S2133: NO).

At S2134, protection logic 71 determines whether the access type is data write or data read. It should be noted that this processing corresponds to S2011 in FIG. 20. Processing proceeds to S2135 if the access type is data write (S2134: Write) (because this can be the procedure in FIG. 20), or returns to S2111 if the access type is data read (S2134: Read).

At S2135, protection logic 71 performs a specified arithmetic operation for specified value N stored at S2131 (for example, bit invert or value addition and subtraction), ascertains an arithmetic operation value N', and determines whether the value which MCP 21 is about to write to register alpha 65 is the arithmetic operation value N' or not. It should be noted that the algorithm of the above-mentioned arithmetic operation in which protection logic 71 ascertains the arithmetic operation value N' based on specified value N matches the algorithm in which MCP 21 ascertains the arithmetic operation value N' based on specified value N.

Protection logic 71 outputs "1" (protect) if the value which MCP 21 is about to write to register alpha 65 matches arithmetic operation value N (S2135: YES), (because this matches the procedure in FIG. 20), or returns to S2111 if the value which MCP 21 is about to write to register alpha 65 does not match arithmetic operation value N' (S2135: NO).

As explained above, since the information system 1 releases program code protection only in the case register alpha 65, register beta 66, and register gamma 67 are accessed in accordance with the specified procedures, the contents of the program code can be surely prevented from being carelessly changed due to thermal runaway, a bug, and the like even when a plurality of cores 211 of MCP 21 share a program code in PGC storage area 221 of memory 22.

APPLICATION EXAMPLE (1)

Figure 22:
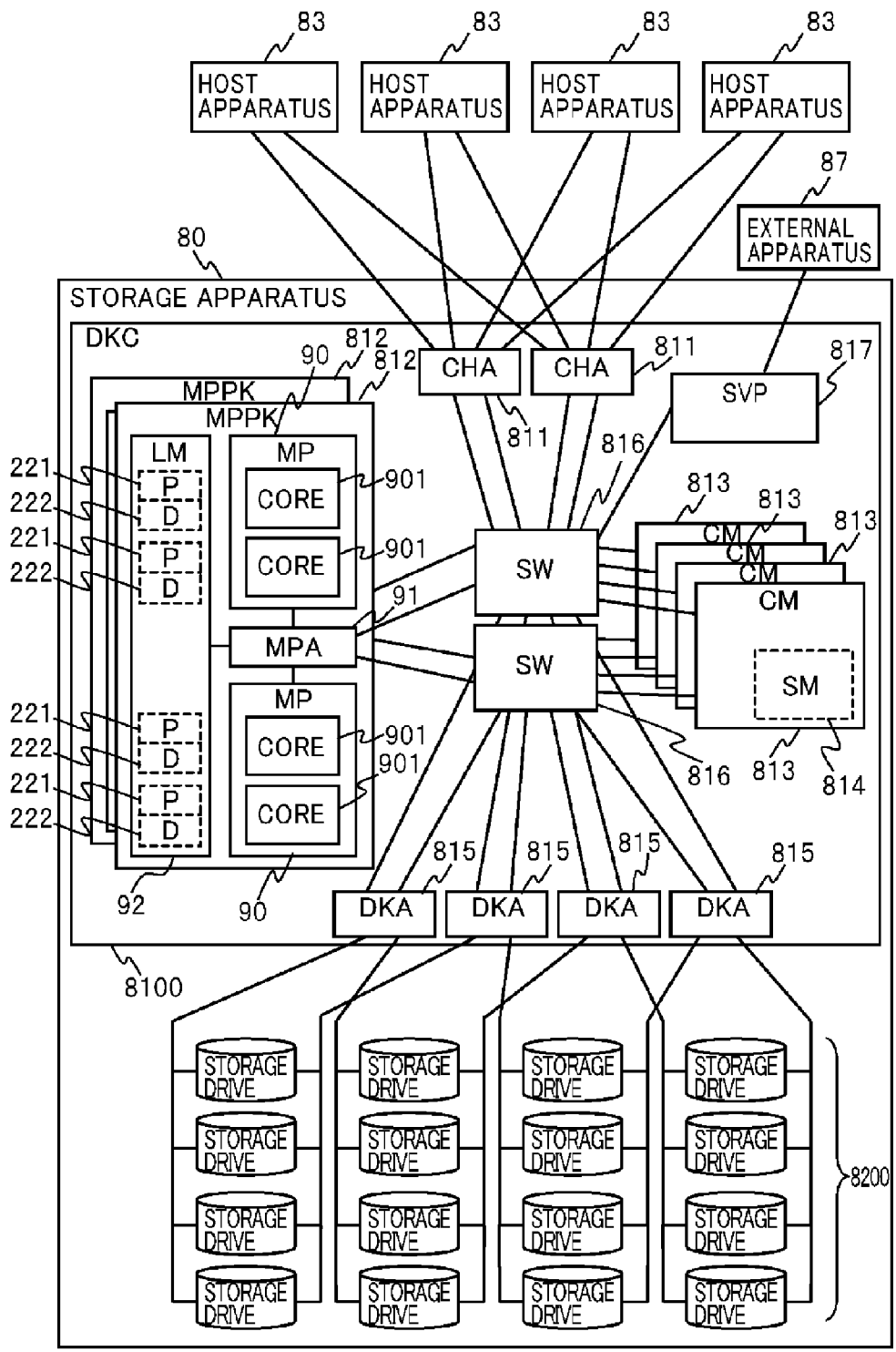
FIG. 22 is a diagram showing a hardware configuration of storage apparatus 80.

FIG. 22 is a hardware configuration of the storage apparatus 80 shown as an application example (1) of the technology explained above. As shown in the figure, storage apparatus 80 is configured to include a controller 8100 (DKC (DisK Controller)) and one or more storage drives 8200 coupled to the controller 8100.

Controller 8100 includes one or more communication interfaces (hereinafter referred to as CHAs (Channel Adaptors) 811), one or more microprocessors (hereinafter referred to as MPPKs (Micro Processor PacKages) 812), a cache memory (hereinafter referred to as a CM (Cache Memory) 813), a shared memory (hereinafter referred to as an SM (Shared Memory) 814), one or more disk adaptors (hereinafter referred to as DKAs (Disk Adaptors) 815), one or more switch devices (hereinafter referred to as an SW (SWitch) 816), and a maintenance apparatus (hereinafter referred to as an SVP (SerVice Processor) 817).

CHA 811 communicates with host apparatus 83 by way of the communication network. An I/O request transmitted from host apparatus 83 is received by CHA 811, and a response to the received I/O request (for example, data which is read from storage drives 8200, a completion report of data write to storage drives 8200) is transmitted from CHA 811 to the host apparatus 83.

MPPK 812 includes a high-speed, large-capacity data transfer mechanism such as DMA (Direct Memory Access) and performs relatively large-capacity data transfer performed as needed among CHAs 811, CM 813, SM 814, and DKAs 815. This data transfer is performed when, for example, passing of data read from storage drives 8200 (hereinafter referred to as read data), passing of data written to storage drives 8200 (hereinafter referred to as write data), staging data to CM 813 (reading data from storage drives 8200 to CM 813), destaging data stored in CM 813 (writing data to the storage drives 8200 from CM 813), and the like.

As shown in FIG. 22, MPPK 812 includes one or more MPs 90, an MPA (Micro Processor Adaptor) 91, and a local memory (hereinafter referred to as an LM (Local Memory) 92). Among the above, MP 90 comprises a plurality of core processors 901. It should be noted that MP 90 is equivalent to the above-mentioned MCP 21, and core processor 901 is equivalent to the above-mentioned core 211. Furthermore, MP 90 comprises an MMU which is equivalent to the above-mentioned memory management unit and an interrupt processing unit which is equivalent to the above-mentioned interrupt controller 213.

MPA 91 communicates with MP 90s and with LM 92, and also communicates with CHA 811, CM 813, SM 814, and DKAs 815 by way of SW 816. All or a part of the above-mentioned logic circuits 170 can be implemented in this MPA 91.

The program codes executed by respective core processors 901 which MP 90 includes and data which respective core processors 901 utilize are stored in LM 92. LM 92 is equivalent to the above-mentioned memory 22.

CM 813 is configured to include a DRAM and the like. The data which is the target of I/O requests, for example, is temporarily stored in CM 813.

The SM 814 is configured of a DRAM, an NVRAM, and the like. Data used for controlling the processing related to I/O requests, for example, and other types of data are stored in SM 814. It should be noted that SM 814 may also be realized as a part of the storage area of CM 813, and may also be realized as hardware which is independent of CM 813.

DKA 815 communicates with storage drives 8200 in data read from storage drive 8200 and in data write to storage drives 8200.

SW 816 is a device which relays communication which is performed as needed among CHAs 811, MPPKs 812, CM 813, SM 814, DKAs 815, and SVP 817 and is configured using, for example, a high-speed crossbar switch (Cross Bar Switch) and the like.

SVP 817 is a computer which communicates with the respective components of storage apparatus 80 (CHAs 811, MPPKs 812, CM 813, SM 814, DKAs 815, and storage drives 8200) by way of SW 816 or other communication means than SW 816 for maintenance of storage apparatus 80 and for other purposes. Furthermore, SVP 817 can also communicate with external apparatus 87 of storage apparatus 80. The above-mentioned user apparatus 10 communicates with respective core processors 901 which MP 90 in MPPK 812 includes by way of SVP 817. SVP 817 and external apparatus 87 are equivalent to the above-mentioned user apparatus 10.

Storage drive 8200 is a physical recording media which are, for example, a hard disk drive, a semiconductor storage device (SSD), and the like. Storage drive 8200 communicates with DKAs 815 in accordance with standards such as an SAS interface (Serial Attached SCSI), SATA (Serial ATA), FC (Fibre Channel), PATA (Parallel ATA), and SCSI.

As explained above, the above-mentioned technology can be applied to storage apparatus 80 configured as explained above. Subsequently, when the above-mentioned technology is applied to storage apparatus 80, the effect on the scalability and performance guarantee of storage apparatus 80 can be expected.

APPLICATION EXAMPLE (2)

Figure 23:
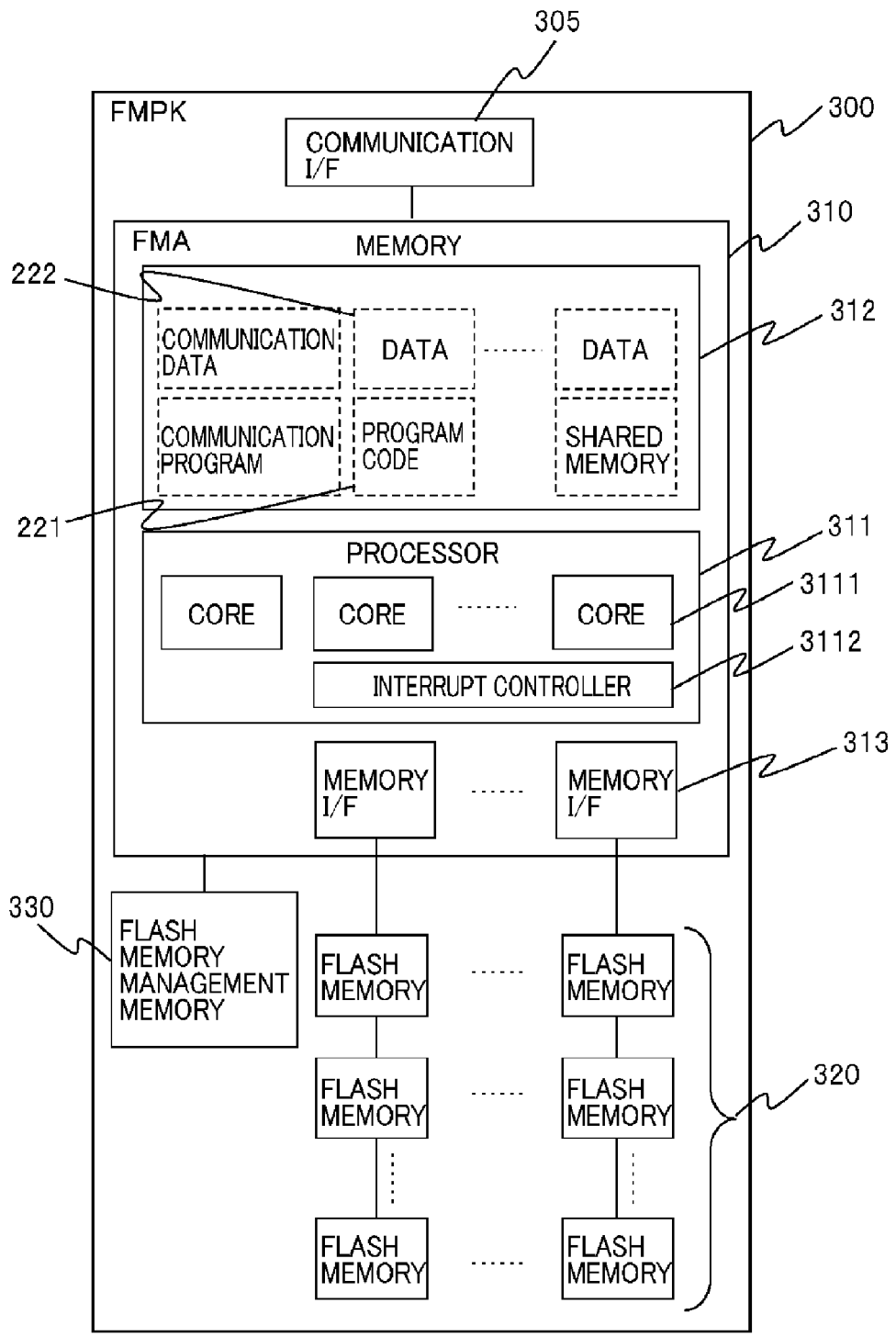
FIG. 23 is a diagram showing a hardware configuration of FMPK 300.

FIG. 23 is an apparatus which is used as storage drive 8200 of storage apparatus 80, and the like shown in FIG. 22 (hereinafter referred to as FMPK (Flash Memory PacKage) 300). The configuration of the above-mentioned information system 1 can also be applied to the internal configuration of storage drive 8200 in this way.

As shown in FIG. 23, FMPK 300 includes a communication interface (hereinafter referred to as communication I/F 305) for communicating with higher-level devices such as storage apparatus 80, FMA (Flash Memory Adaptor) 310, one or more flash memories 320 in which data accepted from storage apparatus 80 is stored, and flash memory management memory 330 in which information related to control of flash memories 320 and other types of information are stored. In addition, FMA 310 includes processor 311, memory 312, and a memory interface (hereinafter referred to as memory I/F 313). Furthermore, processor 311 includes a plurality of core processors 3111 and interrupt controller 3112.

Communication I/F 305 communicates with, for example, the above-mentioned DKAs 815. For example, when communication I/F 305 and DKAs 815 communicate in accordance with the SAS standard, communication I/F 305 functions as an SAS controller.

FMA 310 performs processing related to access to flash memories 320 depending on I/O requests (data write, data read) which the communication I/F 305 receives. Processor 311 of FMA 310 is equivalent to the above-mentioned MCP 21, and core processor 3111 which MCP 21 includes is equivalent to the above-mentioned core 211. Furthermore, interrupt controller 3112 is equivalent to the above-mentioned interrupt controller 213. Memory 312 is equivalent to the above-mentioned memory 22. It should be noted that, for example, the program codes and data for FMA 310 to implement communication with storage apparatus 80 by way of communication I/F 305 are stored in memory 312.

As explained above, the above-mentioned technology can also be applied to the internal configuration of FMPK 300 which is used as storage drive 8200 of storage apparatus 80, and the like.

APPLICATION EXAMPLE (3)

Figure 24:
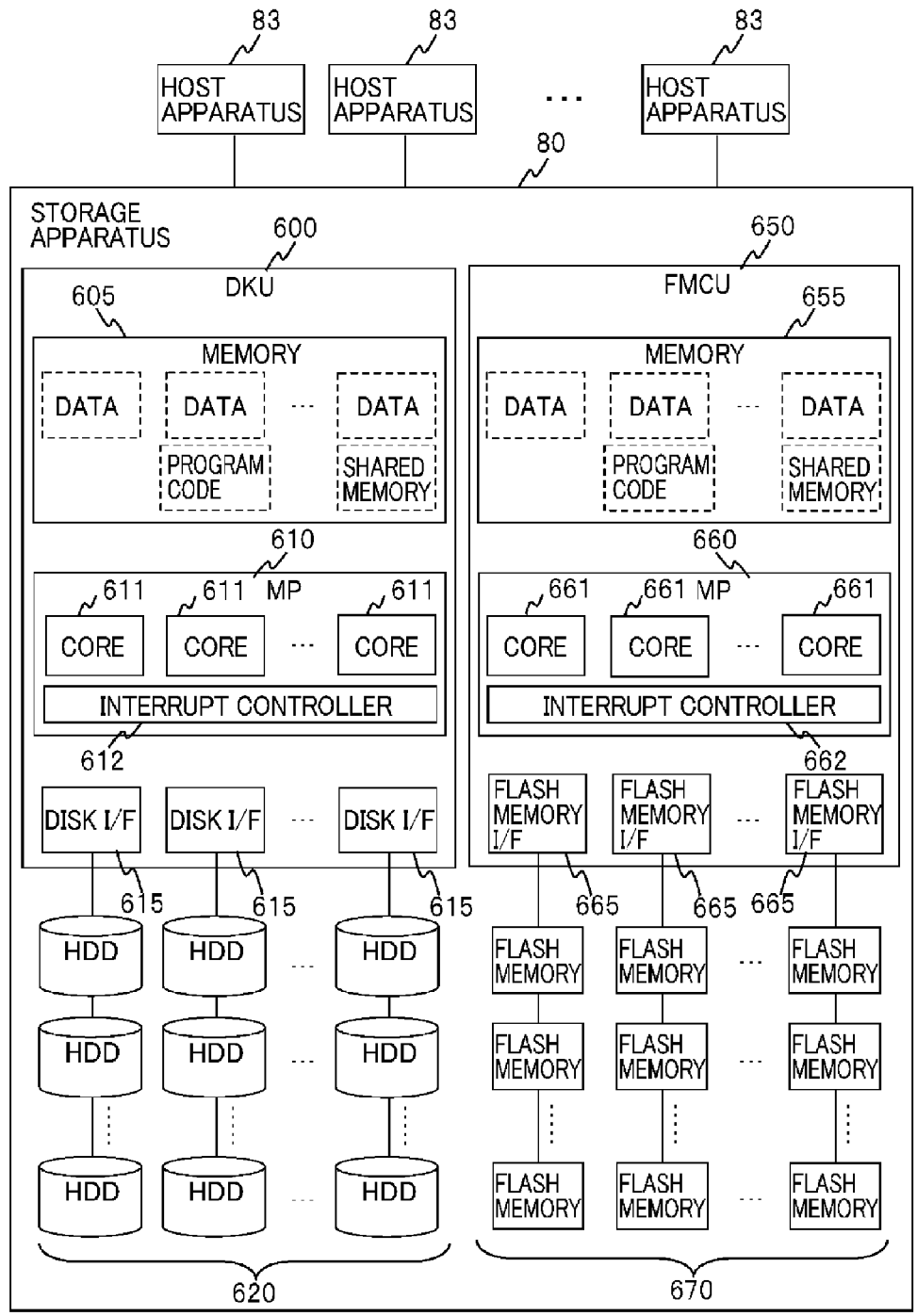
FIG. 24 is a diagram showing another hardware configuration of storage apparatus 80.
Figure 25:
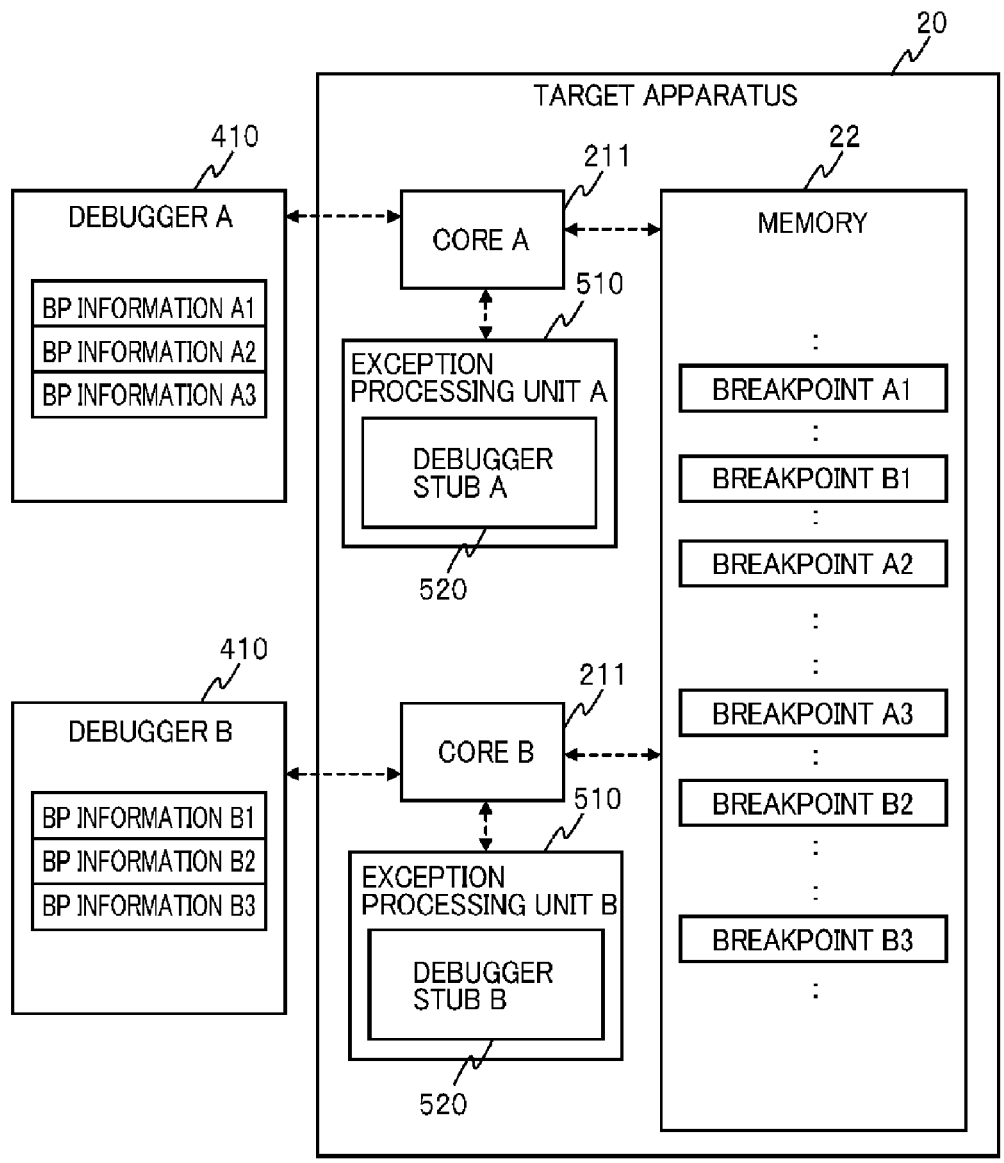
FIG. 25 is a diagram showing an example of a debug environment of the core processor.

FIG. 24 is an example of another hardware configuration of storage apparatus 80 shown as application example (3) of the above-mentioned technology. This storage apparatus 80 can utilize as data recording media both, one or more hard disk devices (hereinafter referred to as HDDs 620) and one or more flash memories 670.

As shown in FIG. 24, storage apparatus 80 includes a disk control unit (hereinafter referred to as DKU (DisK control Unit) 600) which controls data I/O for HDDs 620 and flash memory control unit (hereinafter referred to as FMCU (Flash Memory Control Unit) 650) which controls data I/O for flash memories 670.

DKU 600 includes one or more disk interfaces (disk I/Fs 615) which communicate with MP 610, memory 605, and HDDs 620. MP 610 is a multi-core processor which comprises a plurality of core processors 611 and an interrupt controller 612. MP 610 is equivalent to the above-mentioned MCP 21, and core processor 611 is equivalent to the above-mentioned core 211. Furthermore, interrupt controller 612 is equivalent to the above-mentioned interrupt controller 213.

Meanwhile, FMCU 650 includes one or more flash memory interfaces 665 which communicate with MP 660, memory 655, and flash memories 670. MP 660 is a multi-core processor which includes a plurality of core processors 661 and interrupt controller 662. MP 660 is equivalent to the above-mentioned MCP 21, and core processor 661 is equivalent to the above-mentioned core 211. Furthermore, interrupt controller 662 is equivalent to the above-mentioned interrupt controller 213.

In this way, the above-mentioned technology can be applied to storage apparatus 80 in which both HDDs 620 and flash memories 670 can be utilized as data recording media. And, when the above-mentioned technology is applied to storage apparatus 80 configured as above, effect on the scalability and performance guarantee of storage apparatus 80 can be expected.

Although the embodiments have been explained hereinabove, the above-mentioned embodiments are only to facilitate the understanding of the present invention, and not intended to limit the interpretation of the present invention. The present invention can be changed and modified without departing from the scope of the invention and includes equivalents thereof.

For example, although MCP 21 including a plurality of cores 211 has been explained as an example in the above-mentioned embodiments, the above-mentioned mechanism related to sharing program codes among a plurality of cores 211 can also be applied to an information system of a multi-processor configuration where a plurality of singlecore processors share a memory.

The invention claimed is:

1. An information system, comprising:
a plurality of processors configured to share and execute a program code stored in a memory;
a debugger that implements a debug environment of the program code for each of the plurality of processors; and
a plurality of debugger stubs communicable with one another that are implemented in each of the plurality of processors, and communicate with the debugger to control execution of the program code by the processors;
wherein each of the debugger stubs:
retains breakpoint setting information including a setting location of a breakpoint which is set for debugging the program code of the processor by which the debugger stub is implemented, and a content of an instruction to which the breakpoint is set,
communicates with another debugger stub to suspend execution of the program code executed by the processor implementing the other debugger stub, when detecting that an instruction to be performed is a breakpoint, during sequential execution of the program code by the processor implementing the debugger stub,
controls execution of the program code by the processor implementing the debugger stub and execution of the program code by the processors implementing the other debugger stub, while acquiring or providing the breakpoint setting information retained by each of the debugger stubs by communication with the other debugger stub, according to whether the debugger stub retains the content of the instruction to which the breakpoint is set, and
in a case the debugger stub does not retain the content of the instruction to which the breakpoint is set, acquires an instruction content from the other debugger stub retaining the content of the breakpoint, writes the content of the acquired instruction to the setting location of the breakpoint and executes the instruction, and thereafter communicates with the other debugger stub to resume execution of the program code by the processor implementing the other debugger stub.

2. The information system according to claim 1, wherein each of the debugger stubs, in a case the debugger stub retains the content of the instruction to which the breakpoint is set, communicates with the other debugger stub to specify a breakpoint whose setting location is different from a breakpoint set for debugging the program code of the processor implementing another debugger stub, among breakpoints set for debugging the program code of the processor implementing the debugger stub, writes the content of the instruction to which the specified breakpoint is set to each of the setting locations, and thereafter communicates with the other debugger stub to resume execution of the program code by the processor implementing the other debugger stub.

3. The information system according to claim 1, wherein:
each of the debugger stubs includes an accessible shared memory, and
each of the debugger stubs acquires or provides the breakpoint setting information between the other debugger stub through the shared memory.

4. The information system according to claim 1, wherein:
each of the processors includes an interrupt controller for implementing a function for interrupting another one of the processors, and
each of the debugger stubs generates an interrupt from the processor implementing the debugger stub to the processor implementing the other debugger stub to control, suspend, and resume execution of the program code by the other processor.

5. An information system, comprising:
a plurality of processors configured to share and execute a program code stored in a memory;
a plurality of debuggers that are provided to each of the processors and implement a debug environment of the program code for each of the processors that the plurality of debuggers are in charge of; and
a plurality of debugger stubs communicative with one another that are implemented in the respective processors, and communicate with the debuggers to control execution of the program code by the processors;
wherein each of the debuggers:
retains breakpoint setting information including a setting location of a breakpoint which is set for debugging the program code of the processor by which the debugger is in charge of, and a content of an instruction to which the breakpoint is set,
communicates with another debugger to suspend execution of the program code executed by the processor which the another debugger is in charge of, when detecting that an instruction to be performed is a breakpoint, during sequential execution of the program code by the processor in which the debugger is in charge of,
controls execution of the program code by the processor which the debugger is in charge of and execution of the program code by the processors which the another debugger is in charge of, while acquiring or providing the breakpoint setting information retained by each of the plurality of debuggers by communication with the another debugger, according to whether the debugger retains the content of the instruction to which the relevant breakpoint is set, and
in a case the debugger does not retain the content of the instruction to which the breakpoint is set, acquires an instruction content from the another debugger retaining the content of the breakpoint, writes the content of the acquired instruction to the setting location of the breakpoint and executes the instruction, and thereafter communicates with the another debugger to resume execution of the program code by the processor which the another debugger is in charge of.

6. The information system according to claim 5, wherein each of the debuggers, in a case the debugger retains the content of the instruction to which the breakpoint is set, communicates with the another debugger to specify a breakpoint whose setting location is different from a breakpoint set for debugging the program code of the processor which the another debugger is in charge of, among breakpoints set for debugging the program code of the processor which a local debugger stub is in charge of, writes the content of the instruction to which the specified breakpoint is set to each of the setting locations, and thereafter communicates with the another debugger stub to resume execution of the program code by the processor which the another debugger stub is in charge of.

7. The information system according to claim 5, wherein one of the processors:
   transmits an instruction to stop execution of a program code to all the other processors,
   performs an update of the program code after receiving a notification notifying that execution of the program code was stopped from all the other processors, and
   transmits an instruction to reboot to all the other processors after the update and thereafter reboots itself.

8. The information system according to claim 5, wherein one of the processors:
   stores an updated program code updated from the program code, into a storage area different from a storage area in which the program code is stored,
   transmits an instruction to stop execution of a program code to all of the other processors, and
   transmits a reboot instruction to all the other processors after receiving a notification notifying that execution of the program code from all the other processors has been stopped, and thereafter reboots itself.

9. The information system according to claim 5, wherein the information system includes:
   a protection logic that outputs a signal indicating whether protection is set for the program code stored in the memory, and
   a circuit prohibiting a change to the program code by the processor, in a case an access destination of the processor is in a predetermined area of a storage area of the memory as well as the protection logic outputting the signal indicating that protection is set.

10. The information system according to claim 9, wherein the protection logic to which a continuous address is attached includes a plurality of accessible registers, and
   the protection logic outputs a signal indicating unprotect as the signal indicating whether the protection setting is set in a case the processor accesses each of the plurality of registers in a predetermined order.

11. The information system according to claim 10, wherein the information system includes, as the plurality of registers, a first register specified by a first address, a second register specified by a second address greater than the first address, and a third register specified by a third address greater than the second address, and
   the access in the predetermined order is performed by accessing the first register, then accessing the third register, and subsequently accessing the second register.

12. The information system according to claim 11, wherein:
   the access in the predetermined order is performed by accessing the first register, then accessing the third register as well as acquiring a value M from the protection logic, and subsequently writing in the second register a value obtained by performing a predetermined arithmetic operation to the value M, and
   the protection logic outputs a signal indicating unprotect as the signal indicating whether the protection setting is set in a case the processor accesses each of the plurality of registers in the predetermined order, as well as the processor writes in the second register a value M' obtained by the processor performing an arithmetic operation to the value M.

13. The information system according to claim 5, wherein each of the plurality of processors is a core processor configuring a same multi-core processor.

14. The information system according to claim 13, wherein the multi-core processor is a processor of an AMP (Asymmetric Multiple Processor) configuration.

15. A method of an information system including
   a plurality of processors configured to share and execute a program code stored in a memory,
   a debugger that implements a debug environment of the program code for each of the plurality of processors, and
   a plurality of debugger stubs communicable with one another that are implemented in each of the plurality of processors, and communicate with the debugger to control execution of the program code by the processors,
   the method comprising each of the debugger stubs:
      retaining breakpoint setting information including a setting location of a breakpoint which is set for debugging the program code of the processor by which the debugger stub is implemented, and a content of an instruction to which the breakpoint is set,
      communicating with another debugger stub to suspend execution of the program code executed by the processor implementing the other debugger stub, when detecting that an instruction to be performed is a breakpoint, during sequential execution of the program code by the processor implementing the debugger stub,
      controlling execution of the program code by the processor implementing the debugger stub and execution of the program code by the processors implementing the other debugger stub, while acquiring or providing the breakpoint setting information retained by each of the debugger stubs by communication with the other debugger stub, according to whether the debugger stub retains the content of the instruction to which the breakpoint is set, and
      in a case the debugger stub does not retain the content of the instruction to which the breakpoint is set, acquiring an instruction content from the other debugger stub retaining the content of the breakpoint, writing the content of the acquired instruction to the setting location of the breakpoint and executing the instruction, and thereafter communicating with the other debugger stub to resume execution of the program code by the processor implementing the other debugger stub.

16. The method of an information system according to claim 15, wherein one of the processors:
   stores an updated program code updated from the program code into a storage area different from a storage area in which the program code is stored,
   transmits an instruction to stop execution of a program code to all of the other processors, and
   transmits a reboot instruction to all the other processors after receiving a notification notifying that execution of the program code from all the other processors has been stopped, and thereafter reboots itself.

17. The method of an information system according to claim 15, wherein the information system further includes:

a protection logic that outputs a signal indicating whether protection is set for the program code stored in the memory, a circuit prohibiting a change to the program code by the processor, in a case an access destination of the processor is in a predetermined area of a storage area of the memory as well as the protection logic outputting the signal indicating that protection is set, a plurality of registers accessible by the protection logic to which a continuous address is attached, and the protection logic outputs a signal indicating unprotect as the signal indicating whether the protection setting is set in a case the processor accesses each of the plurality of registers in a predetermined order.

\* \* \* \* \*